(12) United States Patent
Bang et al.

(10) Patent No.: US 11,370,342 B2
(45) Date of Patent: Jun. 28, 2022

(54) HOLDING APPARATUS

(71) Applicant: Bombardier Inc., Dorval (CA)

(72) Inventors: Seung Joon Bang, Laval (CA); Tim Fagan, Beaconsfield (CA)

(73) Assignee: BOMBARDIER INC.

( * ) Notice: Subject to any disclaimer, the term of this patent is extended or adjusted under 35 U.S.C. 154(b) by 181 days.

(21) Appl. No.: 16/667,576

(22) Filed: Oct. 29, 2019

(65) Prior Publication Data

US 2020/0130554 A1 Apr. 30, 2020

Related U.S. Application Data

(60) Provisional application No. 62/785,223, filed on Dec. 26, 2018, provisional application No. 62/752,761, filed on Oct. 30, 2018.

(51) Int. Cl.
| | |
|---|---|
| *F16M 11/00* | (2006.01) |
| *B60N 3/10* | (2006.01) |
| *B60R 7/04* | (2006.01) |
| *B60R 11/00* | (2006.01) |

(52) U.S. Cl.
CPC ............ *B60N 3/102* (2013.01); *B60N 3/105* (2013.01); *B60R 7/04* (2013.01); *B60R 2011/0045* (2013.01); *B60R 2011/0082* (2013.01)

(58) Field of Classification Search
CPC .......... B60N 3/105; B60R 7/04; B60N 3/102
See application file for complete search history.

(56) References Cited

U.S. PATENT DOCUMENTS

| | | | | |
|---|---|---|---|---|
| 5,018,633 A | * | 5/1991 | Toth | .............. B60N 3/102 |
| | | | | 224/483 |
| 5,505,516 A | | 4/1996 | Spykerman et al. | |
| 5,897,089 A | | 4/1999 | Lancaster et al. | |
| 2015/0375684 A1 | * | 12/2015 | Gillis | .............. B60R 7/04 |
| | | | | 296/24.34 |
| 2017/0043725 A1 | * | 2/2017 | Parlow | ............ B60R 7/043 |
| 2017/0320442 A1 | * | 11/2017 | Zhang | .............. B60R 7/04 |
| 2020/0101886 A1 | * | 4/2020 | Shibata | ............. B60N 3/105 |

* cited by examiner

*Primary Examiner* — Amy J. Sterling
(74) *Attorney, Agent, or Firm* — Fishman Stewart PLLC

(57) ABSTRACT

An apparatus for a vehicle having a carriage and a rotatable insert configured to be moved between a stowed position and an open position in the carriage. The carriage is configured to be mounted within a side-ledge and includes a first carriage panel having a first slot and a second slot. The first slot has an arcuate curve thereto and the second slot is linear. The rotatable insert includes a first insert panel and a compartment. The first insert panel includes first and second protrusions extending therefrom that are configured to respectively engage the first and second slots such that, as the rotatable insert is moved to the open position, the first and second protrusions travel respectively up the first and second slots. The compartment that is hidden when in the stowed position and can carry at least one item when in the open position.

19 Claims, 17 Drawing Sheets

HOLDING APPARATUS

FIELD OF TECHNOLOGY

An improved holding apparatus for a vehicle side-ledge is disclosed. Improvements are applicable to aircrafts, trains, and other vehicles having a side-ledge in a passenger compartment or cabin.

BACKGROUND

Holding apparatuses are often employed in passenger vehicles so that personal items may be stored in a convenient and stable location. For example, a holding apparatus such as a cup holder may be installed in various locations of a passenger cabin for holding drinking vessels.

Interior cabin space, being a limited resource in passenger cabins, is generally a consideration when designing a holding apparatus for passenger cabins. For example, in order to use passenger aircraft cabin space efficiently, cup holders are often integrated into folding serving trays that are affixed to the backside of passenger seats. Similarly, with respect to passenger trains, individual fold-out cup holders are often directly affixed to the backside of passenger seats. While the placement of these apparatuses often utilize cabin space efficiently, other issue can arise due to such placement. For example, often the cup holders integrated into folding trays of aircrafts may only be used when the tray is in the folded down position. With respect to passenger trains, individual fold-out cup holders may be a nuisance to a passenger if inadvertently left in the open position when not in use.

Other issues associated with holding apparatuses are related to installation, repair, and maintenance. A holding apparatus that is difficult to install may increase labor costs associated with the installation or replacement. Further, if a holding apparatus is not durable, necessary repairs and replacement may also increase labor costs. Still further, if a holding apparatus cannot be quickly cleaned (e.g., cleaning up a spilled liquid), labor cost associated with cleaning may also increase.

Thus, there is a need to create holding apparatuses that efficiently uses cabin space and are easily installed, repaired, and maintained.

DETAILED DESCRIPTION

Figure 1:
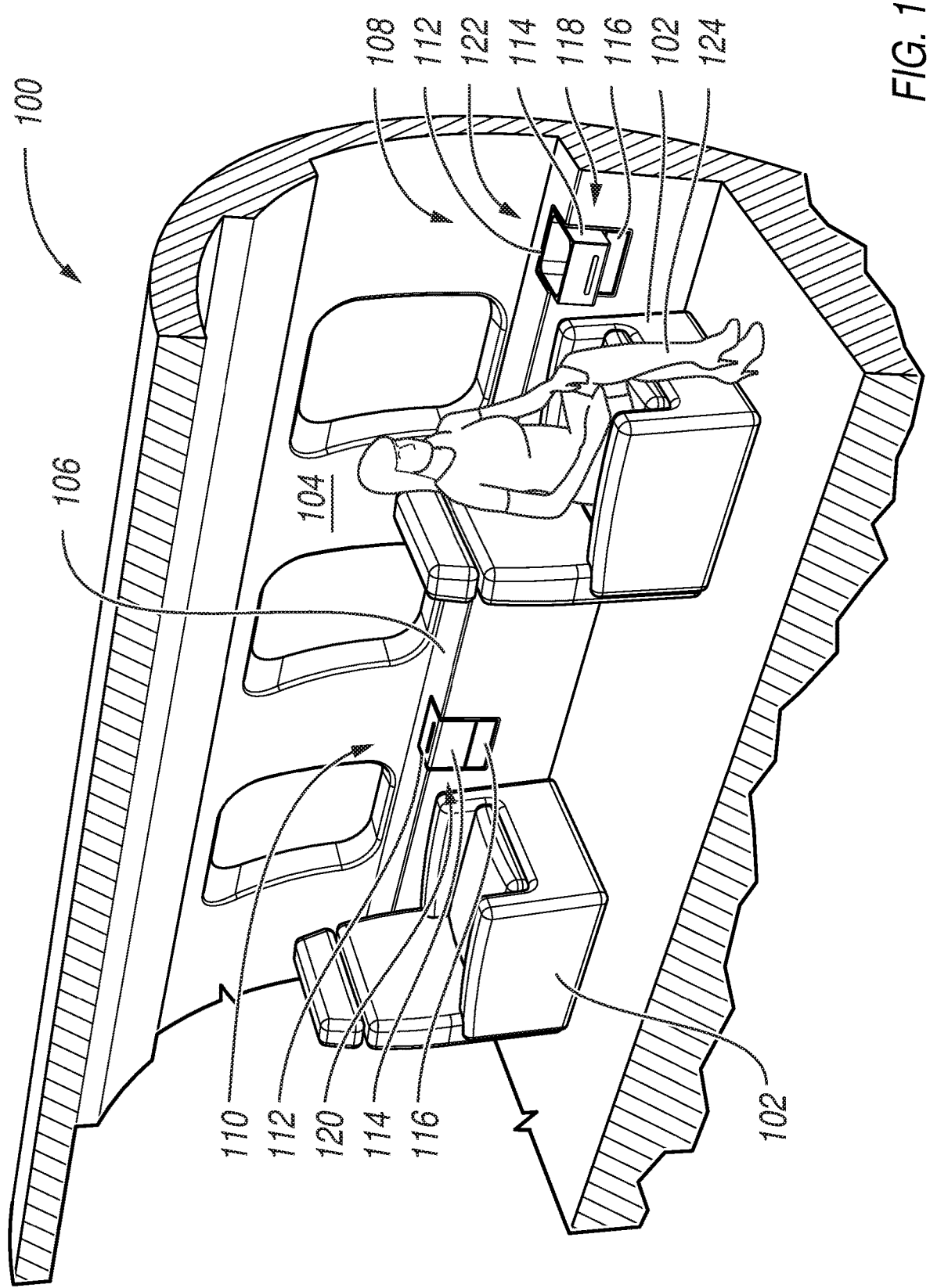
FIG. 1 illustrates a perspective view of a portion of an passenger aircraft cabin having holding apparatuses.

FIG. 1 illustrates a perspective view of a portion of an exemplary aircraft passenger cabin 100. As illustrated, a plurality of passenger seats 102 are shown. Along a cabin wall 104 is a side-ledge 106 of the passenger aircraft cabin 100. A first holding apparatus 108 and a second holding apparatus 110 within the side-ledge 106 are also shown. Each holding apparatus 108, 110 includes a carriage 112, a rotatable insert 114, and a removable panel 116.

While FIG. 1 illustrates an aircraft passenger cabin 100, the holding apparatuses 108, 110 may be employed in a variety of passenger cabins having a side-ledge. For example, though not shown, the holding apparatuses could be integrated into a side-ledge of a passenger train or automobile.

Referring back to FIG. 1, the first holding apparatus 108 is in a first (open) position 118 and the second holding apparatus 110 is in a second (closed) position 120.

While the first holding apparatus 108 is in the first position 118, a compartment (e.g., a tray) 122 of the first holding apparatus 108 is accessible to a user (e.g., passenger 124). This compartment 122 is configured to hold one or more passenger items (e.g., a drinking vessel). Since each holding apparatus 108, 110 is integrated into the side-ledge 106, cabin space is efficiently used. Further, the holding apparatuses 108, 110 do not interfere with passenger legroom.

If, for example, some material (not shown) is spilled on the holding apparatus 108, 110, the removable panel 116 may be removed. As such, the interior (not shown) of the carriage 112 may be efficiently cleaned.

While in the second position 120, the form of the second holding apparatus 110 follows the contours of the side-ledge 106. As such, while in the second position 120, the second holding apparatus 110 does not create an obstruction. Further details regarding the opening and closing of the holding apparatus (e.g., the first holding apparatus 108 and the second holding apparatus 110) are set forth below with respect to FIGS. 2A-4.

Figure 2A:
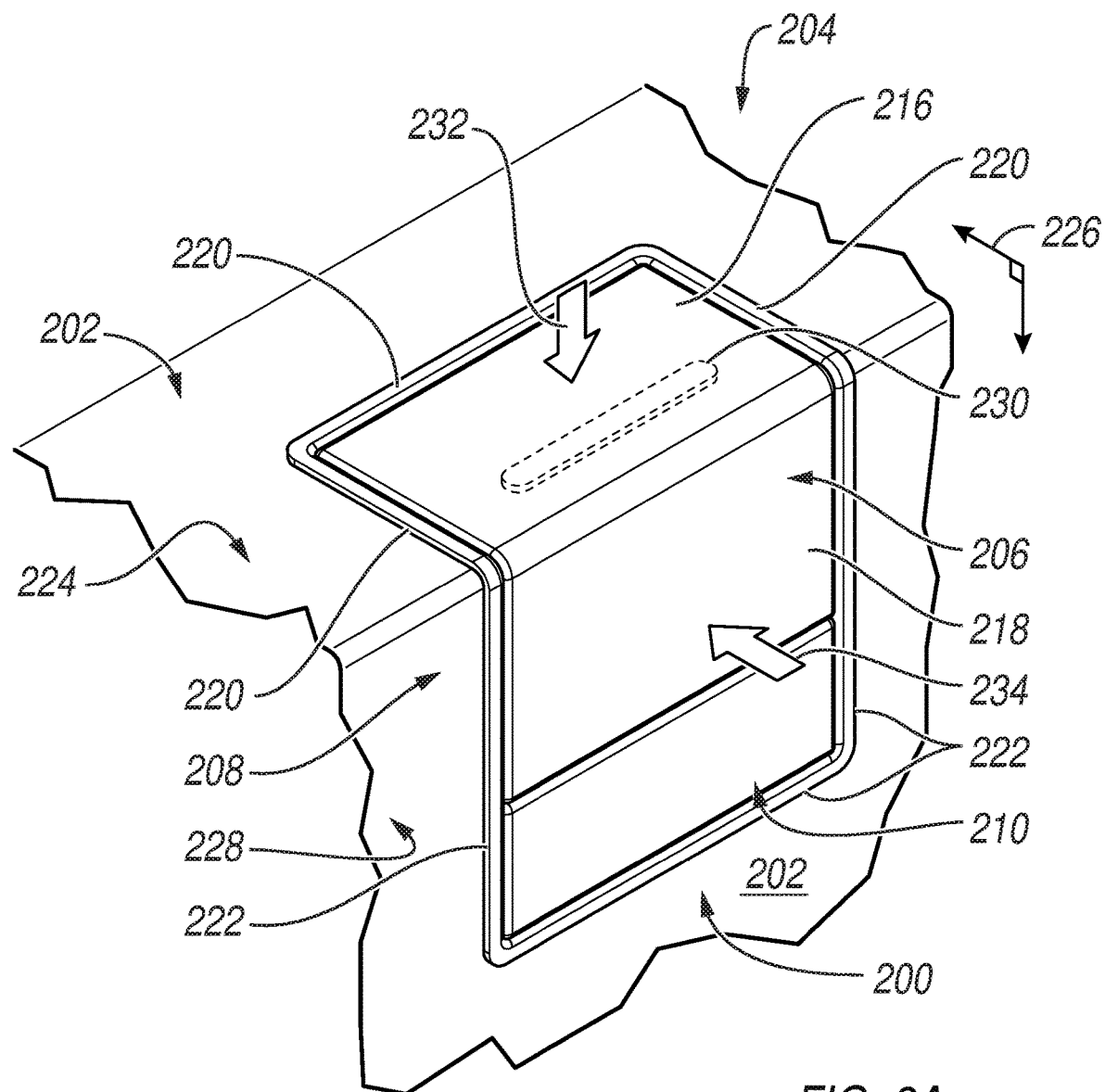
FIG. 2A illustrates a perspective view of an exemplary holding apparatus in a first position while installed within a side-ledge of a passenger cabin.

With reference now to FIG. 2A a perspective view of a holding apparatus 200 is illustrated. As depicted, the holding apparatus 200 is installed in a side-ledge 202 of a vehicle (not shown) and is in a first position 204 (i.e., a closed or stowed position).

The holding apparatus 200 includes a rotatable insert 206, a carriage 208, and a removable panel 210. The removable panel 210 may be removed so that interior portions (not shown) of the holding apparatus 200 may be cleaned or repaired.

As will be described in detail below, the rotatable insert 206 of the holding apparatus 200 is configured to rotate around an axis of rotation 212 (see axis of rotation 212 of FIG. 2B) in a first direction 214.

Referring back to FIG. 2A, the rotatable insert 206 includes a first surface or panel 216 and a second surface or panel 218. The carriage 208 includes an outwardly facing top-perimeter 220 and an outwardly facing side-perimeter 222. Together, the outwardly facing top-perimeter 220 and the outwardly facing side-perimeter 222 form the visible perimeter of the carriage 208 when the holding apparatus 200 is installed in the side-ledge 202.

As depicted, the outwardly facing top-perimeter 220 is substantially orthogonal (i.e., perpendicular) to the outwardly facing side-perimeter 222. Since a horizontal surface 224 of the side-ledge 202 is substantially perpendicular 226 to a vertical surface 228 of the side-ledge 202, the holding apparatus 200 at least approximately follows the contours of the side-ledge 202 when installed and in the first position 204. Accordingly, both the outwardly facing top-perimeter 220 and the first panel 216 are substantially parallel to the horizontal surface 224 of the side-ledge 202, while the outwardly facing side-perimeter 222 and the second panel 218 are substantially parallel to the vertical surface 228 of the side-ledge 202.

Similarly, the first panel 216 of the rotatable insert 206 is substantially perpendicular to the second panel 218 of the rotatable insert 206. Accordingly, when in the first position 204, both the first panel 216 and the outwardly facing top-perimeter 220 are substantially parallel to the horizontal surface 224 of the side-ledge 202, while both the second panel 218 and the outwardly facing side-perimeter 222 are substantially parallel to the vertical surface 228 of the side-ledge 202.

Further, as depicted in FIG. 2A, the first panel 216 and the outwardly facing top-perimeter 220 of the holding apparatus 200 are substantially flush with the horizontal surface 224 of the side-ledge 202 when the rotatable insert 206 is in the first position 204. Similarly, the second panel 218 and the outwardly facing side-perimeter 222 are substantially flush with the vertical surface 228 of the side-ledge 202. Though not shown, it is noted in other examples the upper surfaces 216, 220 need not be flush with the vertical surface 228 of the side-ledge 202 and the side surfaces 218, 222 need not be flush with the vertical surface 228 of the side-ledge 202. Nonetheless, FIG. 2A illustrates the transition between the holding apparatus 200 and the side-ledge 202 as being smooth when the rotatable insert 206 is in the first position 204.

It is also noted that in alternate examples (not shown), the angular relationship between the outwardly facing perimeters of the carriage and the angular relationship between the surfaces of the rotatable insert may be different than ninety (90) degrees. That is, if the horizontal surface of the side-ledge is not at a right angle to the vertical surface of the side-ledge, the holding apparatus may be manufactured so that the visible surfaces of the holding apparatus are at the same angular relationship as that of the horizontal and vertical surfaces of the side-ledge. Accordingly, contours of variously styled side-ledges may at least be approximately followed.

Referring back to FIG. 2A, the first panel 216 of the rotatable insert 206 may include a ridge or bar 230 (shown in phantom) giving a user (not shown) something to grip on to while rotating the rotatable insert 206 to an open position, as will be illustrated below with reference to FIGS. 2B and 2C. Other types of protrusions and/or depressions (neither shown) may instead be employed to aid the user in rotating the rotatable insert 206. Further, the rotatable insert 206 may be free of any protrusion (e.g., bar 230) or depression (not shown). That is, a user may, for example, simply apply a top-surface force 232 to the first panel 216 and/or a side-surface force 234 to the second panel 218 to cause rotation of the rotatable insert 206.

Figure 2B:
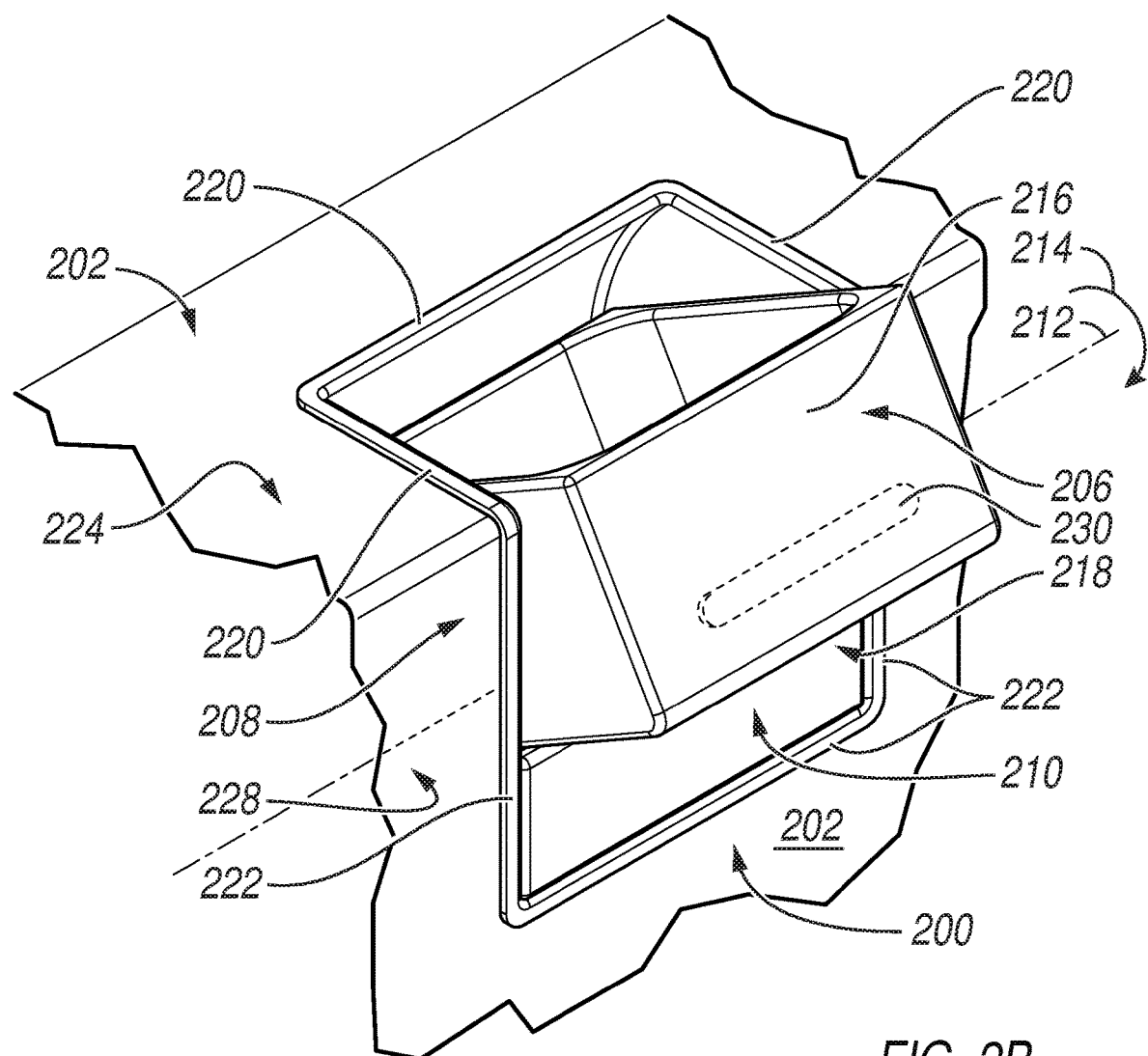
FIG. 2B illustrates a perspective view of the holding apparatus of FIG. 2A during operation of the holding apparatus.

Referring now to FIG. 2B, a perspective view of the holding apparatus 200 as the rotatable insert 206 is being rotated is shown. As illustrated, the rotatable insert 206 of the holding apparatus 200 rotates around an axis of rotation 212 in a first direction 214. As discussed above with respect to FIG. 2A, the user may, for example, apply a top-surface force 232 (FIG. 2A) and/or a bottom-surface force 234 (FIG. 2A) to the rotatable insert 206 to cause rotation around the axis of rotation 212 in the first direction 214 shown in FIG. 2B.

Figure 2C:
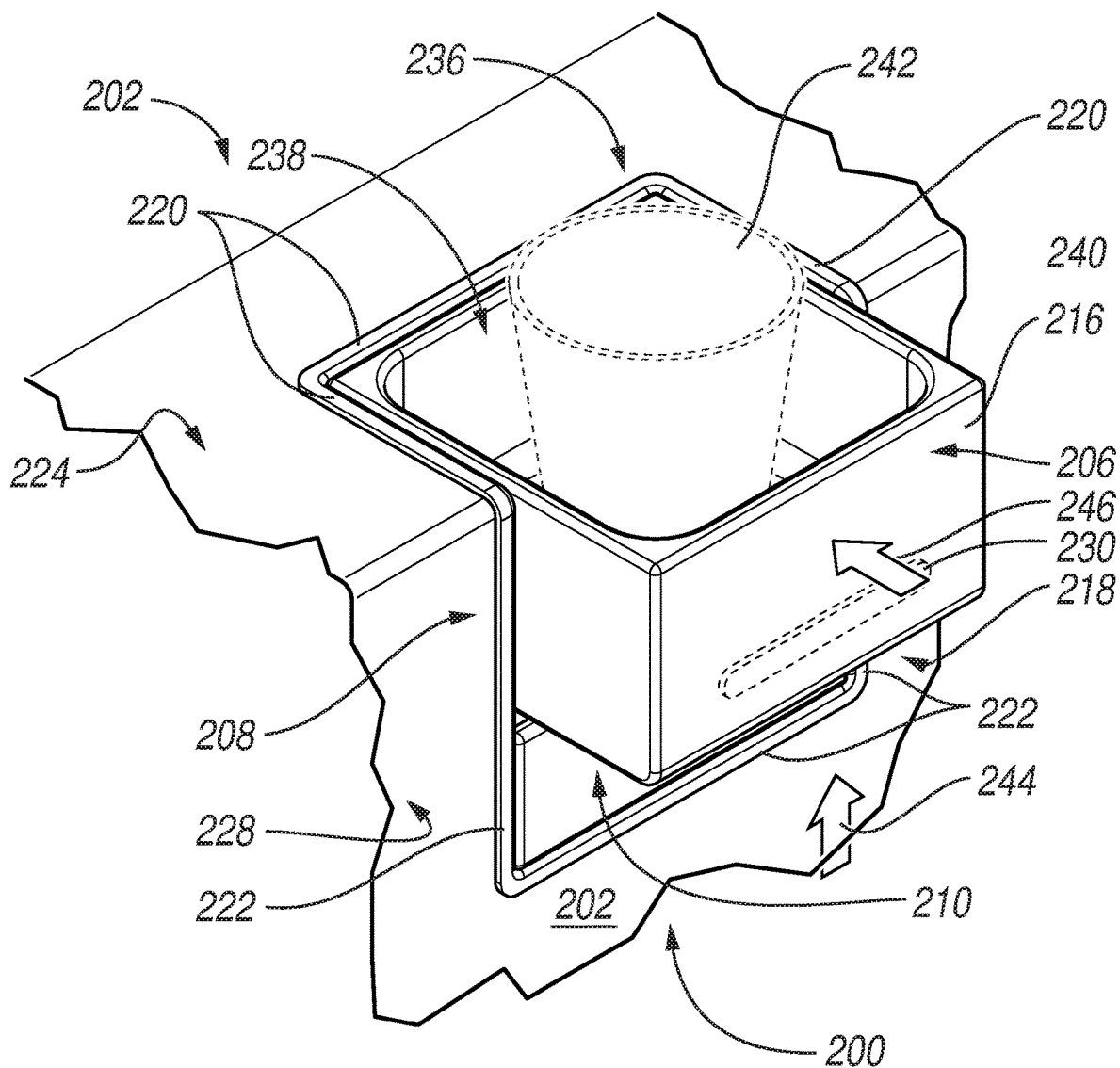
FIG. 2C illustrates a perspective view of the holding apparatus of FIGS. 2A and 2B in a second position.

With reference now to FIG. 2C, a perspective view of the holding apparatus 200 with the rotatable insert 206 in a second or open position 236 is shown. While it is shown that the rotatable insert 206 rotates substantially ninety (90) degrees from the first position 204 (FIG. 2A) to the second position 236 (FIG. 2C), other examples (not shown) may include a rotatable insert that rotates more or less than ninety degrees from the first position to the second position.

Referring back to FIG. 2C, a compartment (i.e., an item holding cavity or tray) 238 of the rotatable insert 206 is accessible for use when the rotatable insert 206 is in the second position 236. The compartment 238 is surrounded by a cavity perimeter 240. While in the second position 236, the cavity perimeter 240 is substantially parallel with the outwardly facing top-perimeter 220 of the carriage 208 and the horizontal surface 224 of the side-ledge 202. In addition to being parallel, the cavity perimeter 240 and the outwardly facing top-perimeter 220 of the carriage 208 is substantially flush with the horizontal surface 224 of the side-ledge 202. Other examples not shown, however, may have the cavity perimeter 240 not parallel and/or not flush with the horizontal surface 224 of the side-ledge 202 when the rotatable insert 206 is in the second position 236.

While in the second position 236, the first panel 216 of the rotatable insert 206 is substantially parallel to the vertical surface 228 of the side-ledge 202 and the second panel 218 of the rotatable insert 206 is substantially parallel with horizontal surface 224 of the side-ledge 202.

The compartment or holding cavity 238 of the rotatable insert 206 is configured to hold one or more user items. For example, the compartment 238 may be configured to hold a drinking vessel 242 (shown in phantom) such as a cup or a cell phone (not shown). While the compartment 238 illustrated in FIG. 2C has a parallelogram-shape, other shapes not shown may also be employed.

The rotatable insert 206 may be rotated back to the closed position 204 (FIG. 2A) by, for example, applying a force 244 (FIG. 2C) to the second panel 218 and/or applying a top-surface force 246 to the first panel 216.

As illustrated in FIGS. 2A-2C, the holding apparatus efficiently uses cabin space and may be easily operated.

Figure 2D:
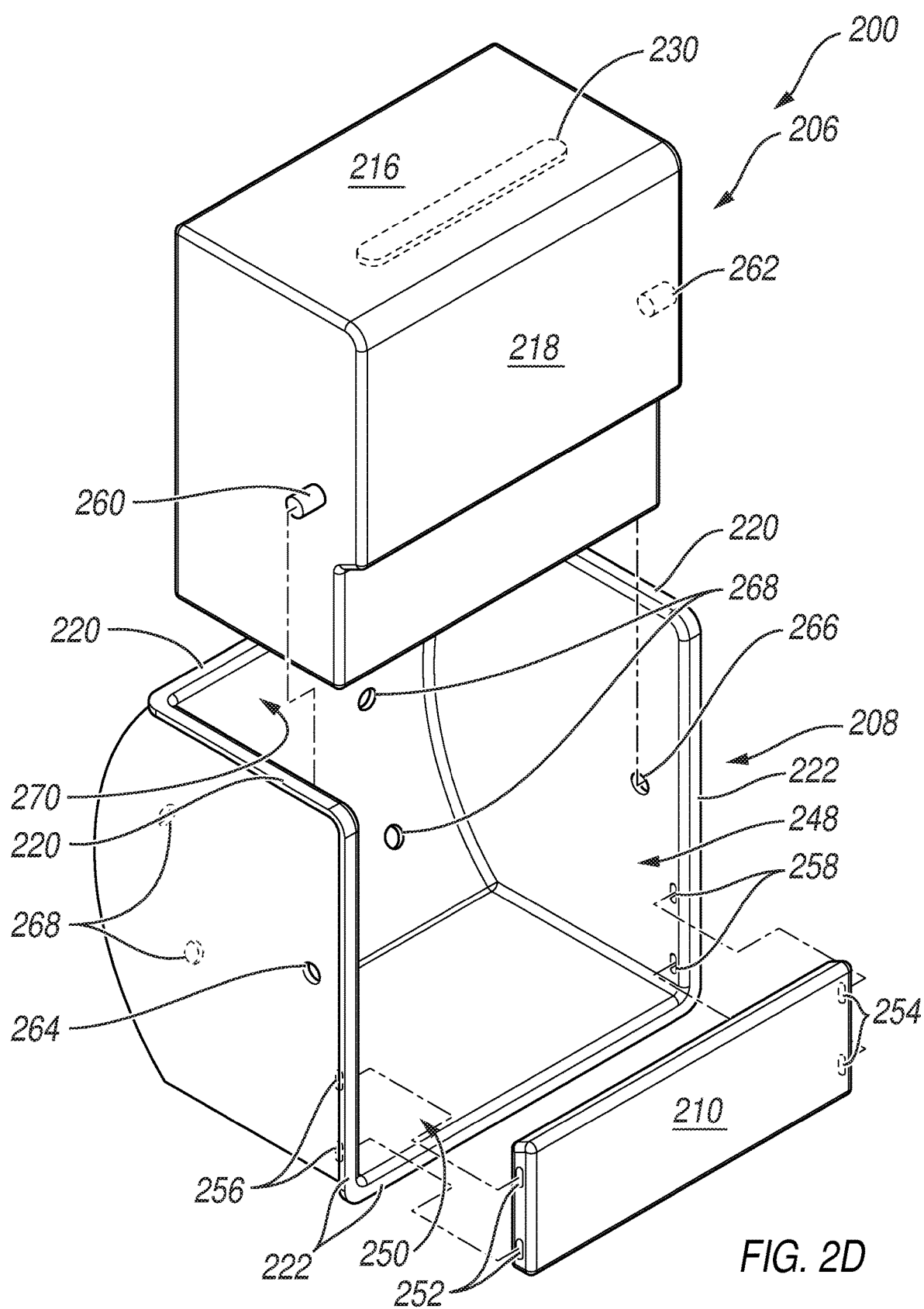
FIG. 2D illustrates an exploded view of the holding apparatus of FIGS. 2A-2C.

Referring now to FIG. 2D, an exploded view of the holding apparatus 200 of FIGS. 2A-2C is illustrated. The carriage 208, rotatable insert 206, and removable panel 210 are shown.

The carriage 208 includes an unenclosed carriage cavity 248. As will be described below, the rotatable insert 206 fits within the carriage cavity 248 and the removable panel 210 covers a bottom portion 250 of the carriage cavity 248.

The removable panel 210 includes a first set of side clips 252 and a second set of side clips 254. The first set of side clips 252 clip into a first set of clip depressions 256 of the carriage 208 and the second set of side clips 254 clip into a second set of clip depressions 258 of the carriage 112. Accordingly, clips 252, 254 and clip depressions 256, 258 serve as a fasting mechanism to allow panel 210 to be removably attached to the carriage 208. When assembled (see e.g., FIGS. 2A-2C), a user does not have access to the carriage cavity 248 while the rotatable insert 206 is in the first or second positions 204, 236, respectively, and the removable panel 210 is affixed to the carriage 208. When the removable panel 210 is removed, however, a user has access to the carriage cavity 248 when the rotatable insert 218 is in the second position 236 (FIG. 2C), though not while the rotatable insert 218 is in the closed position 204. As such, if some material (e.g., liquid from a cup) falls within the carriage cavity 248, the removable panel 210 may be removed so at least the carriage cavity 248 can be cleaned. As such, a cleaning crew, for example, may quickly gain access to the carriage cavity 248 for cleaning by simply removing the removable panel 210. It is noted that due to the shape of the rotatable insert 218, the removable panel 210 overlaps a bottom portion of the rotatable insert 218 when in the closed position 204 (FIG. 2A), but is below the rotatable insert 218 when in the open position 236 (FIG. 2C).

While side clips 252, 254 and clip depressions 256, 258 are shown, other examples (not shown) may employ differing fastening mechanisms to mount the removable panel 210 to the carriage 208 in manner that allows for its removal.

With continued reference to FIG. 2D, the rotatable insert 206 includes a first protrusion 260 and a second protrusion 262, which respectively snap into a first carriage aperture 264 and a second carriage aperture 266 of the carriage 208. In other words, the protrusions 260, 262 and apertures 264, 266 serve as a coupling mechanism allowing the rotatable insert 206 to be coupled to the carriage 208. As such, once the rotatable insert 206 is coupled to the carriage 208 (see e.g., FIG. 2A), the rotatable insert 206 is able to rotate about the axis of rotation 212 that passes through the coupling mechanism (i.e., the protrusions 260, 262 and depressions 264, 266).

With continued reference back to FIG. 2D, the carriage 208 may include a set of holes 268 through a back panel or side 270 of the carriage 208 to enable installation. This set of holes 268 may be configured to allow fasteners (not shown) to pass therethrough so that the carriage 208 may be mounted to the side-ledge (e.g., side-ledge 202 of FIGS. 2A-2C). It is noted that other carriage fastening scenarios (not shown) may instead be employed to mount the carriage within a side-ledge. For example, though not shown, a set of carriage clips may be used to fasten the carriage to the side-ledge. In such a fastening scenario, the apparatus need not have a first set of holes through the back panel.

It is noted than other coupling scenarios (not shown) may be employed to couple the rotatable insert 206 to the carriage 208 to allow the rotatable insert 206 to rotate about the axis of rotation 212 through the carriage 208. Further, a force-assist mechanism (not shown) may be integrated into one or more of these fastening scenarios to aid in the rotation of the rotatable insert 206. The force-assist mechanism could, for example, be a spring loaded device. As such, a force (e.g., the side-surface force 234) applied to the second panel 218 may activate the force-assist mechanism to cause (or at least aid) the rotation of the rotatable insert 206 from the first position 204 to the second position 236 of FIG. 2C.

Figure 3A:
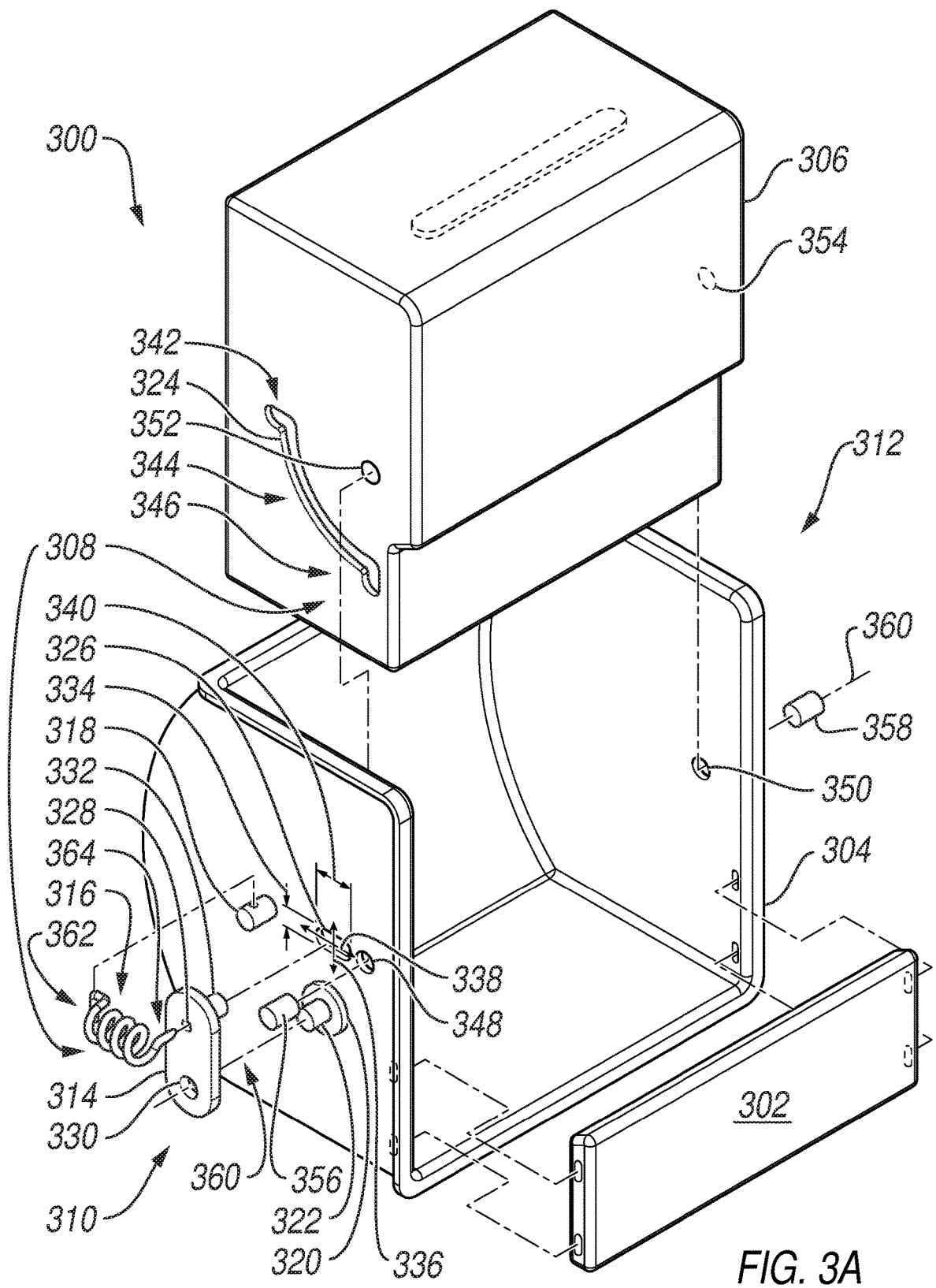
FIG. 3A illustrates an exploded view of another exemplary holding apparatus.
Figure 3B:
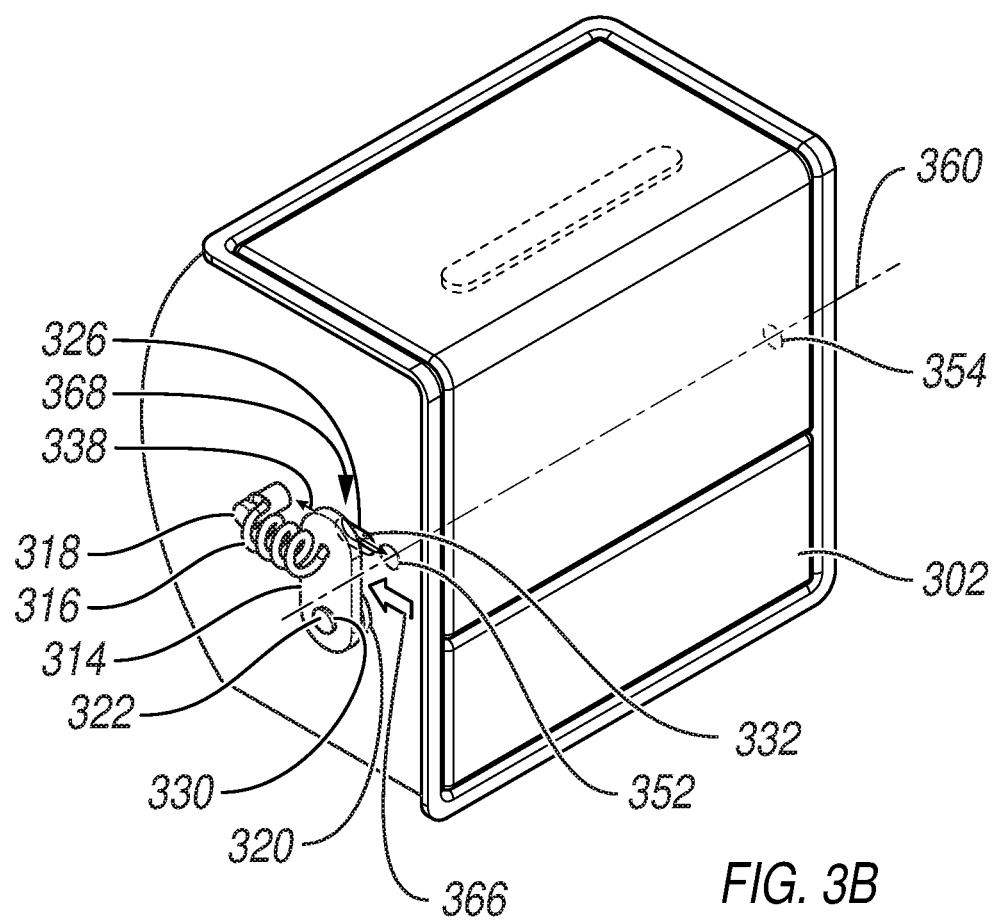
FIG. 3B illustrates a perspective view of the holding apparatus of FIG. 3A assembled.

FIGS. 3A and 3B discussed below illustrate another exemplary holding apparatus 300. FIG. 3A illustrates an exploded view of the holding apparatus 300 and FIG. 3B illustrates a perspective view of the holding apparatus 300 when assembled. Similar to the holding apparatus 200 of FIGS. 2A-2D, the holding apparatus 300 of FIGS. 3A and 3B includes a removable panel 302, a carriage 304, and a rotatable insert 306 configured to rotate from an open to closed position.

Unlike the holding apparatus of FIGS. 2A-2D, the holding apparatus 300 of FIGS. 3A and 3B includes a retaining mechanism 308 to aid in retaining the rotatable insert 306 in a closed position or an open position, which will be further discussed below with respect to FIGS. 3C-3E. The retaining mechanism 308 of FIGS. 3A and 3B is positioned on a first side 310 of the holding apparatus that is opposite a second side 312 of the holding apparatus 300. Though not shown, the retaining mechanism 308 may instead be on the second side 312. Alternatively, a second retaining mechanism (not shown) may also be employed on the second side 312 in addition to the retaining mechanism 308 on the first side 310.

Referring to FIG. 3A, the retaining mechanism 308 includes a retaining plate 314, a spring 316, a spring post 318, a spacer 320, a pivot post 322, a guide groove 324 in the rotatable insert 306, and an oblong aperture 326 thru the carriage 304.

The retaining plate 314 includes a first aperture 328, a second aperture 330, and a retaining post 332. The oblong aperture 326 has a first diameter 334 along a minor axis 336, where the first diameter 334 is slightly larger than the diameter of the retaining post 332. Along a major axis 338, the oblong aperture 326 has a second diameter 340 slightly larger than the first diameter 334. The groove 324 includes a first end 342, a body 344, and a second end 344.

Similar to the holding apparatus 200 of FIGS. 2A-2D, the holding apparatus 300 of FIGS. 3A and 3B includes a first aperture 348 and a second aperture 350 passing through the carriage 300, as well as a first depression 352 and a second depression 354 in the rotatable insert 306. However, instead of first and second protrusions 260, 262 (FIG. 2D), the holding apparatus 300 of FIGS. 3A and 3B include a first pivot pin 356 and a second pivot pin 358.

When the exemplary holding apparatus 300 is assembled (FIG. 3B), the first depression 352 and a second depression 354 of the rotatable insert 306 respectively align with the first aperture 348 and the second aperture 350 of the carriage 304. The first pivot pin 352 may then be passed partially thru the first aperture 348 of the carriage 304 and snap-fit into the first depression 352 of the rotatable insert 306. Similarly, the second pivot pin 358 may be partially passed thru the second aperture 350 of the carriage 304 and snap-fit into the second depression 354 of the rotatable insert 306. As such, once the holding apparatus 300 is assembled, the rotatable insert 306 may be rotated about an axis of rotation 360 from an open position to a closed position.

With regard to the retaining mechanism 308 of FIGS. 3A and 3B, when the retaining plate 314 of the retaining mechanism 308 is attached to the carriage 304, the retaining post 332 passes through the oblong aperture 326 and the second aperture 330 passes over the pivot post 322. The second aperture 330 of the retaining plate 314 passes over the pivot post 322 such that a lower portion of the retaining plate 314 abuts the spacer 320. The second aperture 330 may be snap-fit over the pivot post 322 such that the retaining plate 314 remains snug against the spacer 330, while still being allowed to at least partially rotate about the pivot post 322.

Once the retaining plate 314 is coupled to the carriage 304, a first end 362 of the spring 316 may be coupled to the spring post 318 and a second end 364 of the spring 316 may be stretched and coupled to the retaining plate 314 via the first aperture 328.

Since the retaining plate 314 may be at least partially rotated about the pivot post 322, the retaining post 332 may move generally along the major axis 338 of the oblong aperture 326. The stretched spring 316, however, applies a retaining or bias force 366 to the retaining plate 314. As such, if no other force is applied, the retaining post 332 is caused to come to rest at a first end 368 of the major axis 336 of the oblong aperture 326.

Figure 3C:
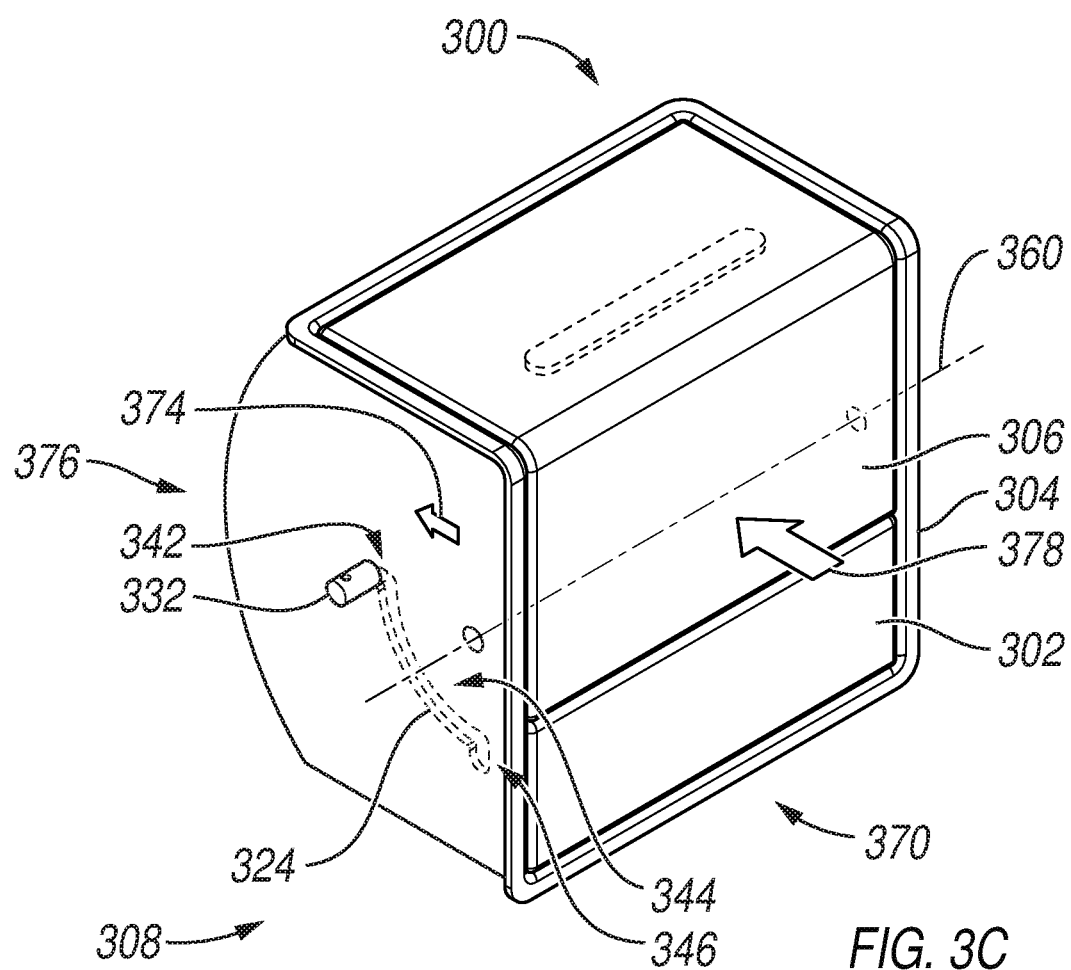
FIG. 3C illustrates a perspective view of the holding apparatus of FIGS. 3A and 3B in a first position.
Figure 3D:
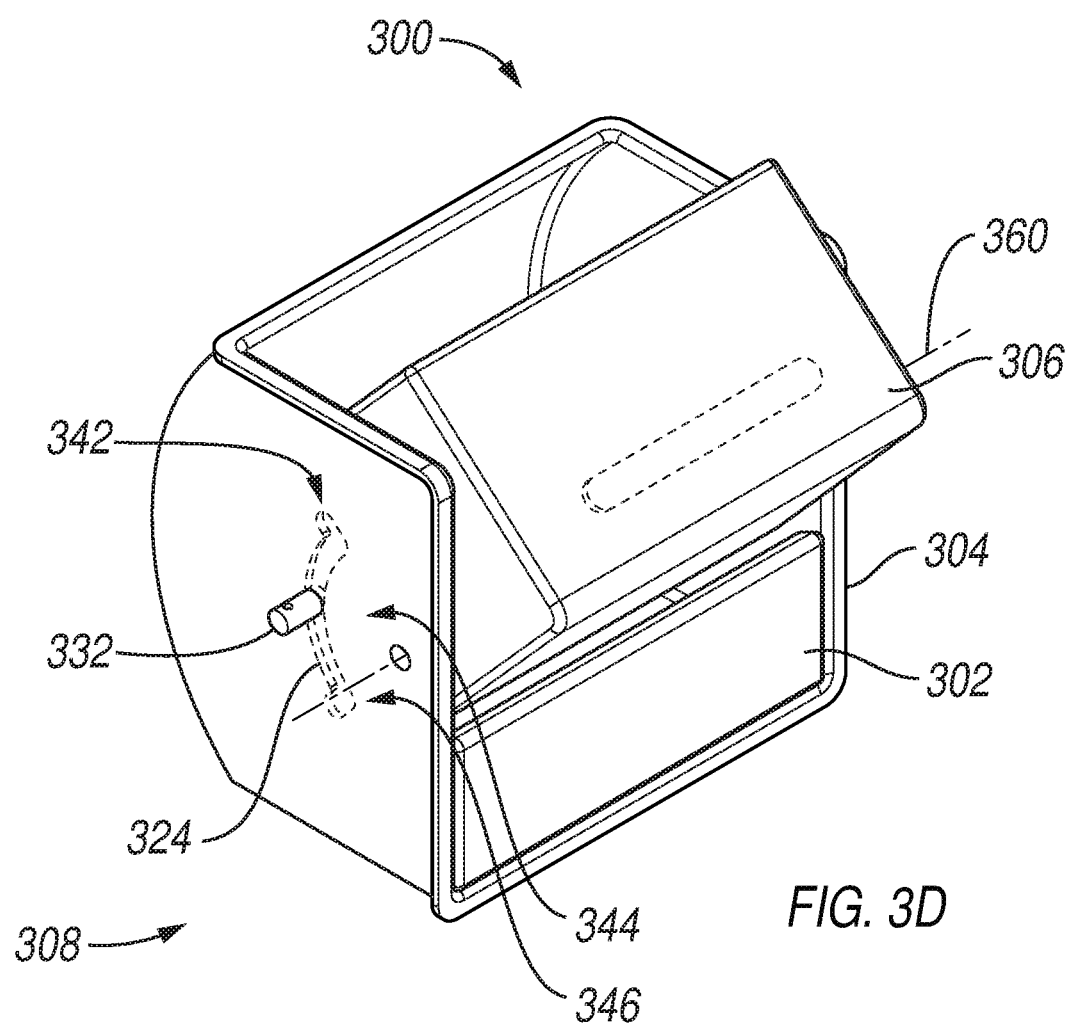
FIG. 3D illustrates a perspective view of the holding apparatus of FIGS. 3A and 3B during operation of the holding apparatus.
Figure 3E:
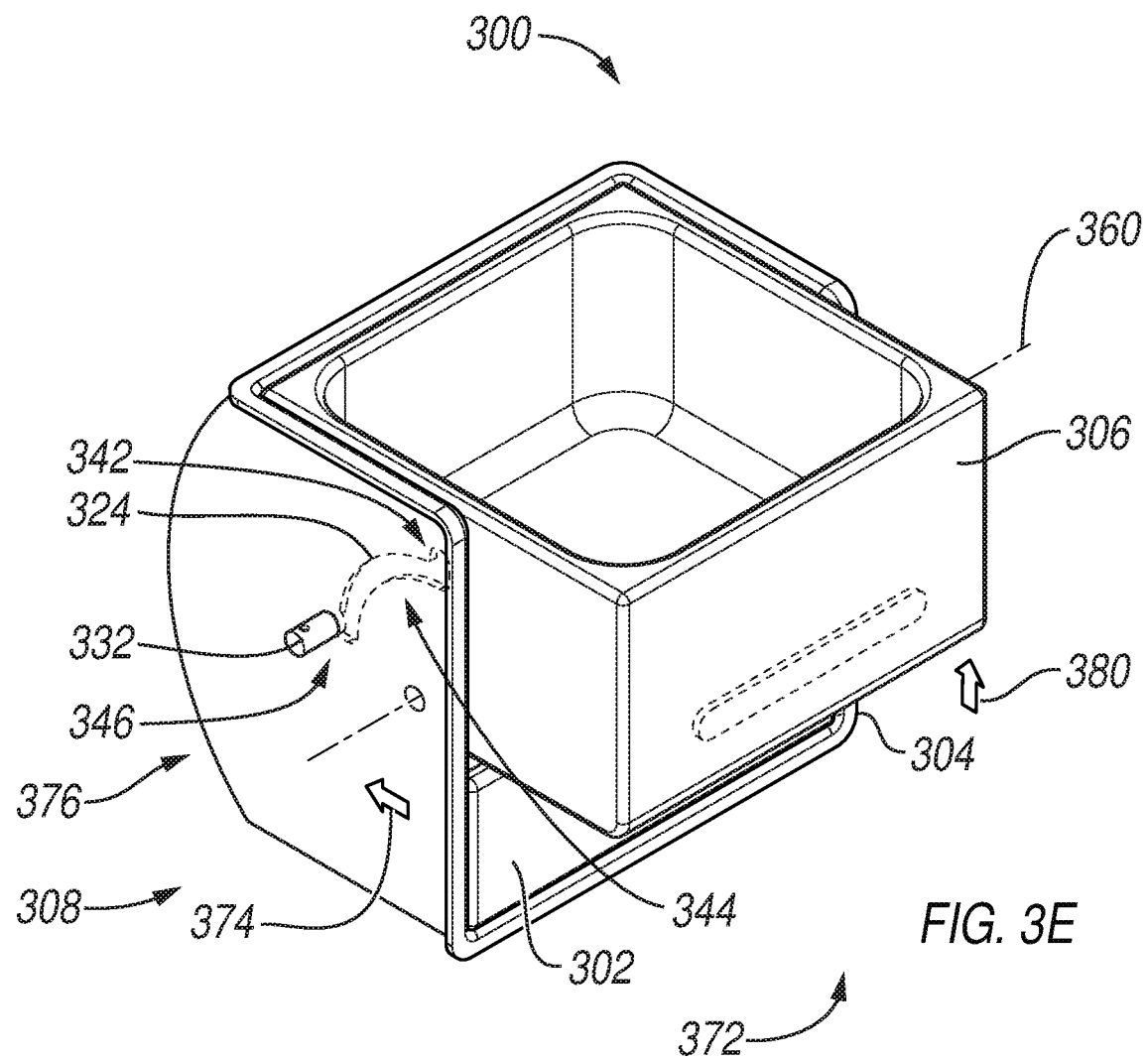
FIG. 3E illustrates a perspective view of the holding apparatus of FIGS. 3A and 3B in a second position.

Referring now to FIGS. 3C-3E, a perspective view of the holding apparatus 300 of FIGS. 3A and 3B is shown. So that the interaction between the retaining post 332 and the groove 324 of the retaining mechanism 308 of FIGS. 3A and 3B can be clearly illustrated during operation, the remainder of the retaining mechanism (see FIGS. 3A and 3B) has been omitted from FIGS. 3C-3E. That is, only the retaining post 332 and the groove 324 of the retaining mechanism 308 are shown in FIGS. 3C through 3E. During actual operation of the exemplary retaining mechanism 308, however, the remaining components of the retaining mechanism 308 shown in FIGS. 3A and 3B would not be omitted.

FIG. 3C illustrates the holding apparatus 300 with the rotatable insert 306 in a first or closed position 370, FIG. 3D illustrates the holding apparatus 300 as the rotatable insert 306 is being rotated, and FIG. 3E illustrates the holding apparatus 300 as the rotatable insert 306 is in a second or open position 372.

With reference to FIGS. 3B and 3C, while the rotatable insert 306 is in the closed position 370, the stretched spring 316 applies the retaining force 366 to the retaining plate 314, which causes the retaining post 332 to come to rest towards the first end 368 of the oblong aperture 326. As such, the portion of the retaining post 332 in the groove 324 comes to rest at the first end 342 of the groove 324.

It is noted that the first end 342 of the groove 324 projects from the body 344 of the groove 324 in a first direction 374 while the rotatable insert 306 is in the closed position 370. The first direction 374 is generally directed towards a rear portion 376 of the holding apparatus 300. In other words, the first direction 374 generally projects towards the backside of the carriage cavity (see e.g., the back side 270 of carriage cavity 248 of FIG. 2D). As such, since the first end 342 of the groove 324 projects towards the first direction 374 while the rotatable insert 306 is in the closed position 370, the retaining force 366 of the spring 316 is applied to the rotatable insert 306, via the retaining post 318, in the first direction 374 to aid in keeping the rotatable insert 306 in the closed position 370. Accordingly, the rotatable insert 306 will likely not inadvertently fall open while in the closed position 306.

A slight force (e.g., a side force 378), however, may be applied to the rotatable insert 306 to overcome the retaining force 366 of the spring 316 and cause the retaining post 332 to move away from the first end 368 of the oblong aperture 326. Accordingly, the portion of the retaining post 332 in the groove 324 may be caused to move from the first end 342 of the groove 324 into the body 344 of the groove 324 as the rotatable insert 306 pivots about the axis of rotation 360, as illustrated in FIG. 3D.

While the retaining post 332 is moving through the body 344 of the groove 324, the retaining force 366 of the spring 316 (FIG. 3B) may provide a haptic feedback to the user (not shown).

Referring now to FIGS. 3B and 3E, when the rotatable insert 306 is moved into the open position 372, the retaining force 366 of the spring 316 that acts on the retaining plate 314 directs the retaining post 332 to move towards the first end 368 of the oblong aperture 326 as it enters the second end 346 of the groove 314. Further, since the second end 346 of the groove 324 projects towards the first direction 374 while the rotatable insert 306 is in the open position 372, the retaining force 366 of the spring 316 is applied the rotatable insert 306 in the first direction 374, which aids in keeping the rotatable insert 306 in the open position 372. Accordingly, the rotatable insert 306 will likely not inadvertently close. In other words, due to the orientation of the second end 346 of the groove 314 when the rotatable insert 306 is in the open position 372, the retaining force 366 of the spring 324 helps to keep the rotatable insert 306 in the open position 372. A slight force (e.g., a bottom force 380), however, may be applied to the rotatable insert 306 to overcome the retaining force 366. As such, the retaining post 332 may move away the first end 368 of the oblong aperture 326, causing the retaining post 332 to enter the body 344 of the groove 324 (FIG. 3D) and eventually back into the first end 342 of the groove 324 (FIG. 3C) as the rotatable insert 306 is rotated back to the closed position 370.

Figure 4:
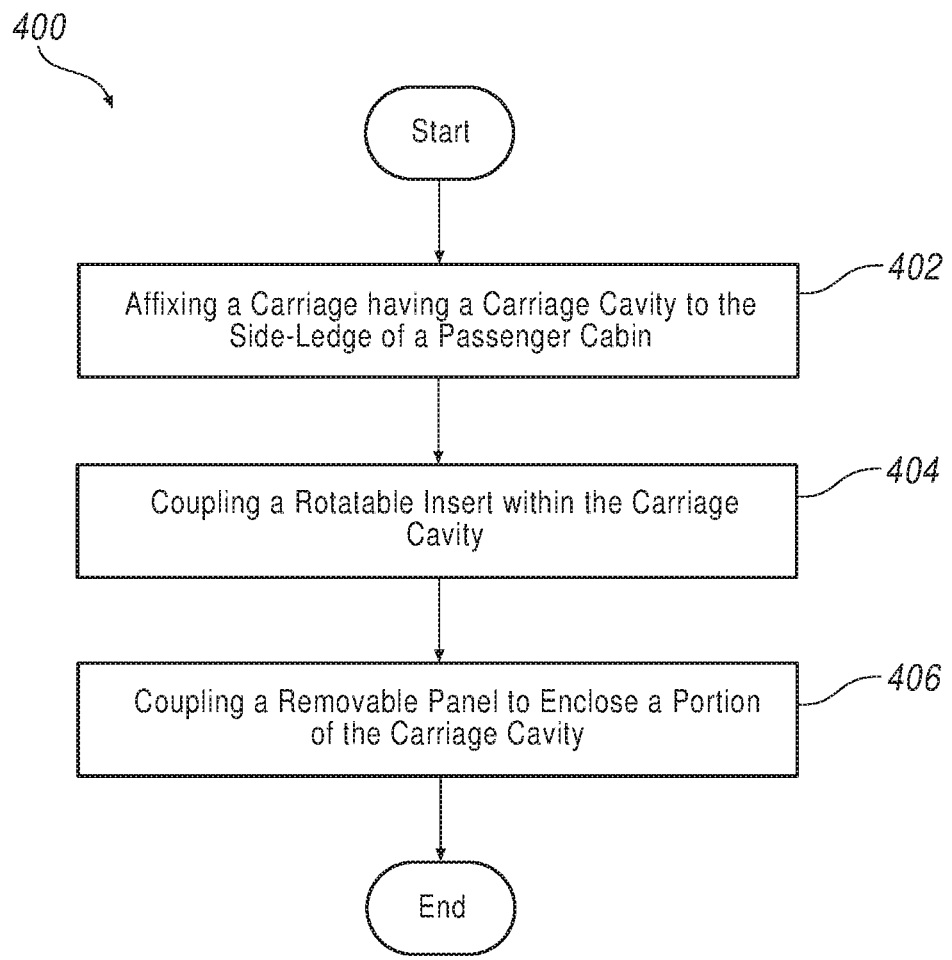
FIG. 4 is a flowchart setting forth an exemplary technique for installing a holding apparatus.

Referring now to FIG. 4, a flowchart illustrating an exemplary technique 400 for installing a holding apparatus (a.k.a. a holding tray apparatus) in a passenger cabin is set forth.

Process control begins at BLOCK 402 where affixing a carriage having a carriage cavity to a side-ledge of a passenger cabin is carried out. The carriage is affixed to the side-ledge such that an outwardly facing top-perimeter of the carriage is substantially parallel with a horizontal surface of the side-ledge and an outwardly facing side-perimeter of the carriage is substantially parallel with a horizontal surface of the side-ledge. The outwardly facing top-perimeter and the outwardly facing side-perimeter form an opening to the carriage cavity.

In addition to the parallel arrangement discussed above, the outwardly facing top-perimeter of the carriage may be substantially flush with that horizontal surface of the side-ledge, while the outwardly facing side-perimeter of the carriage may be substantially flush with a horizontal surface of the side-ledge.

Process control then proceeds to BLOCK 404 where coupling a rotatable insert to the carriage within the carriage cavity is carried out. The carriage cavity includes a tray (e.g., a compartment), a first panel, and a second panel non-parallel to the first panel. The coupling of the rotatable insert to the carriage within the carriage cavity is carried out to allow the tray to remain hidden from view from outside the side-ledge when the rotatable insert is in a first position and for the tray to be exposed from outside the side-ledge when the rotatable insert is rotated to a second position.

Next, process control proceeds to BLOCK 406, where coupling a removable panel to the carriage to enclose a portion of the carriage cavity is set forth. Process control then proceeds to an END.

While exemplary technique 400 may infer an order to BLOCKS 402-406, other exemplary techniques may carry out BLOCKS 402-406 in any order. Regardless of the installation technique employed, after affixing the carriage to the side-ledge, coupling the rotatable insert to the carriage, and coupling the removable panel to the carriage, the carriage cavity is hidden from view from outside the side-ledge when the rotatable insert is in the first position.

Referring back to the flowchart of FIG. 4, it is noted that the coupling of the rotatable insert within the carriage cavity set forth at BLOCK 404 may be carried to also allow the first panel to be substantially flush with the horizontal surface of the side-ledge and the second panel to be substantially flush with the vertical surface of the side-ledge when the rotatable insert is in the first position. In addition, the coupling of the rotatable insert to the carriage within the carriage cavity of BLOCK 404 may also allow the first panel to be substantially parallel with the vertical surface of the side-ledge and the second panel to be substantially parallel with the horizontal surface of the side-ledge when the rotatable insert is in the second position.

With regard to BLOCK 406, the coupling of the removable panel to the carriage may include coupling a first end of the removable panel to a first side of the carriage and coupling a second end of the removable panel to a second side of the carriage, the first side is opposite the second side.

While not shown, technique 400 may also include coupling a retaining mechanism to the carriage to provide a retaining force to the rotatable insert when the rotatable insert is in the first position and the second position, where the retaining force is directed towards a backside of the carriage cavity. As such, the retaining mechanism may aid in keeping the rotatable insert in closed and open positions so that the rotatable insert is not inadvertently moved from either position.

Figure 5A:
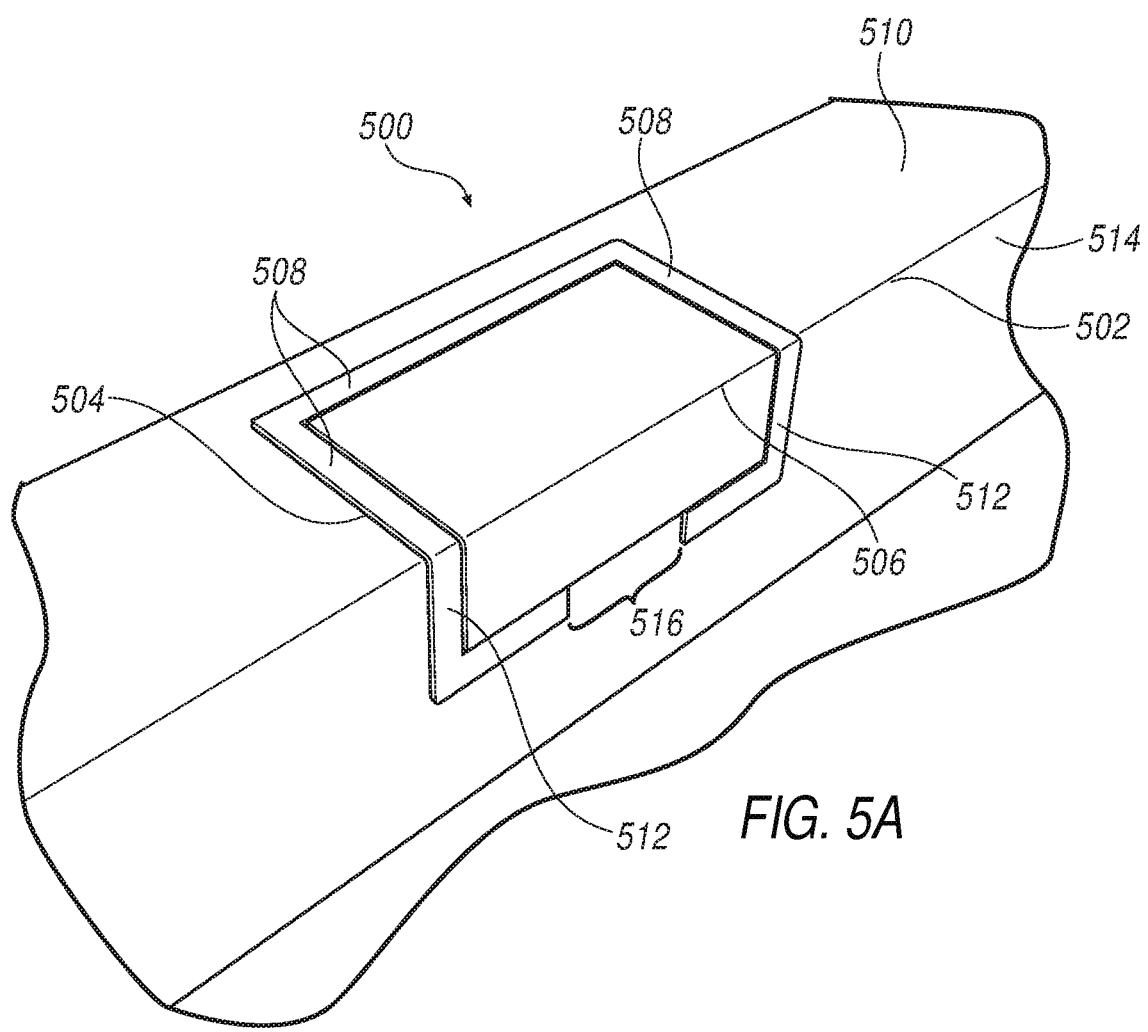
FIG. 5A is a perspective view of another exemplary holding apparatus.

Referring now to FIG. 5A, a perspective view of another exemplary holding apparatus 500 in a side-ledge 502 is illustrated. The holding apparatus 500 includes a carriage 504 and a rotatable insert 506. The rotatable insert 506 is shown in a stowed position. Unlike the holding apparatuses illustrated in FIGS. 1-3C, the holding apparatus 500 of FIG. 5 does not include a removable panel. As such, the holding apparatus 500 takes up less visible space on the side-ledge 502. Nonetheless, a removable panel could be included if desired.

The carriage 504 of the holding apparatus 500 includes an outwardly facing top-perimeter 508 that is substantially parallel with a horizontal surface 510 of the side-ledge 502 and an outwardly facing side-perimeter 512 that is substantially parallel with a vertical surface 514 of the side-ledge 502. There may be a void 516 in a portion of the outwardly facing side-perimeter 512. This void 516 can be employed to allow a user (not shown) to engage with the edge of the rotatable insert 506 during operation. Further discussion of the operation of the holding apparatus 500 will be set forth below.

Due to the arrangement of the carriage's visible perimeters 508, 512 with the side-ledge surfaces 510, 514, the carriage 504 blends in with the side-ledge 502. In another example, though not shown, the outwardly facing top-perimeter 508 may be flush with the horizontal surface 510 of the side-ledge 502 and/or the outwardly facing side-perimeter 512 may be flush with the vertical surface 514 of the side-ledge 502.

Figure 5B:
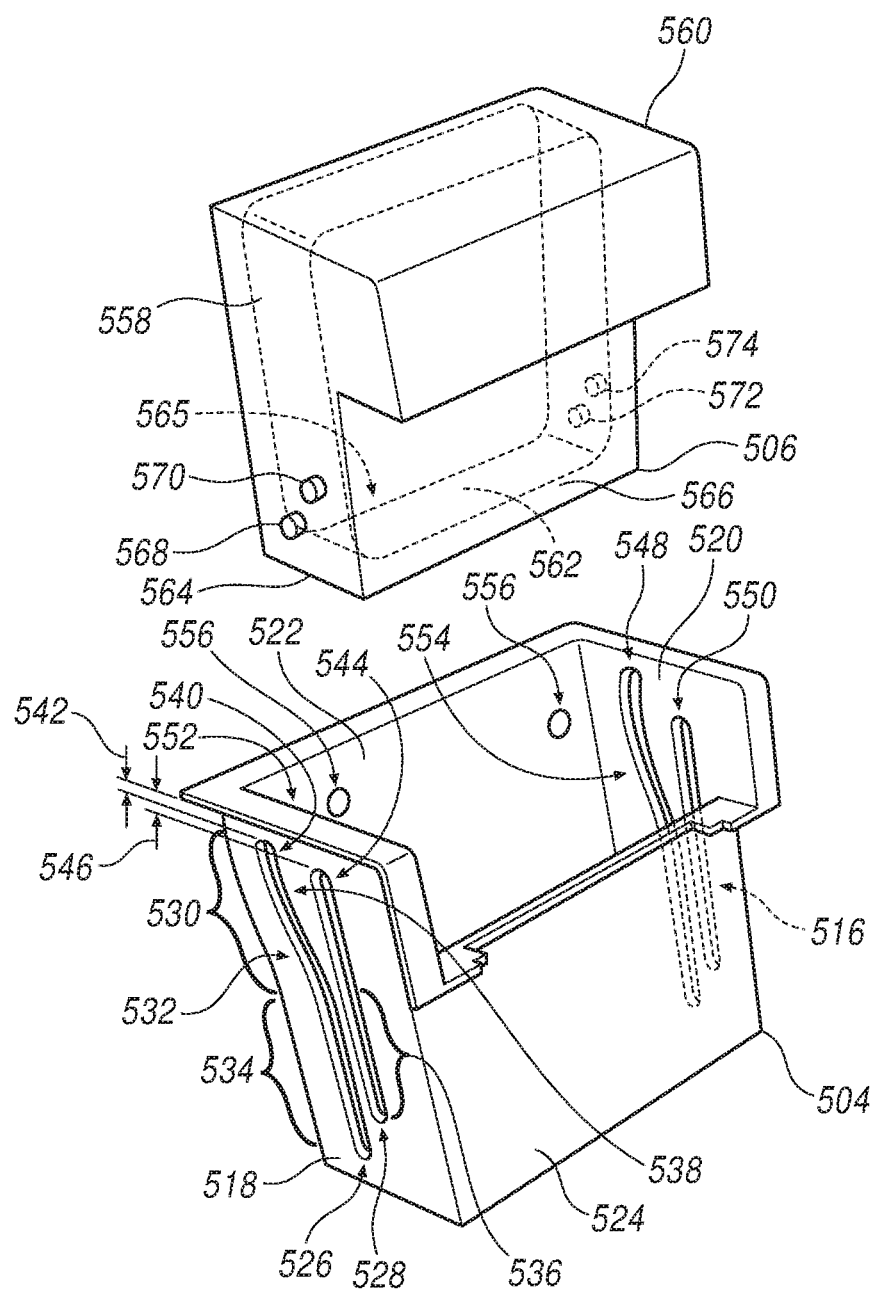
FIG. 5B is an exploded perspective view of the exemplary holding apparatus of FIG. 5A.

With reference now to FIG. 5B, a perspective exploded view of the holding apparatus 500 of FIG. 5A is illustrated. The holding apparatus 500 includes the carriage 504 and the rotatable insert 506. The side-ledge 502 of FIG. 5 is not shown.

The carriage 504 includes a first carriage panel 518 and a second carriage panel 520 opposite the first carriage panel 518. The carriage 504 also includes a rear carriage panel 522 and a front carriage panel 524.

As illustrated, the first carriage panel 518 includes a first slot 526 and a second slot 528 therein. The first and second slots 526, 528 extend substantially vertically up the first carriage panel 518 towards the outwardly facing top-perimeter 508 of the carriage 504. The first slot 526 may be vertically longer than the second slot 528.

The first slot 526 includes an upper portion 530 that is an arcuate curve 532 and a bottom portion 534 that is linear. The second slot 528 is linear and does not include an arcuate curve as the first slot 526 does. A comparison of the first slot 526 with the second slot 528 illustrates that the bottom portion 534 of the first slot 526 is substantially parallel to at least a bottom portion 536 of the second slot 528. Further, a concave portion 538 of the arcuate curve 532 of the first slot 526 faces the second slot 528.

A top end 540 of the first slot 526 is a first slot distance 542 from the outwardly facing top-perimeter 508 and a top end 544 of the second slot 528 is a second slot distance 546 from the outwardly facing top-perimeter 508. Since the first slot distance 542 is less than the second slot distance 546, the first slot 526 extends closer to the outwardly facing top-perimeter 508 of the carriage 504 than the second slot 528.

The second carriage panel 520 may also include one or more slots (see, e.g., the third slot 548 and the fourth slot 550 of the second carriage panel 520). If included, the third slot 548 is congruent in shape to the first slot 526 and the fourth slot 550 is congruent in shape to the second slot 528. While FIG. 5B illustrates the slots 526, 528, 548, 550 passing through each respective carriage panel 518, 520, the first and second slots 526, 528 may instead be only along an interior portion 552 of the first carriage panel 518. Similarly, the third and fourth slot 548, 550 may instead be only along an interior portion 554 second carriage panel 520. That is, though not shown, the slots 526, 528, 548, 550 need not pass through each respective carriage panel 518, 520.

For mounting purposes, the rear carriage panel 522 may include a plurality of mounting holes or apertures 556. As such, the carriage 504 may be mounted to a side-ledge (e.g., the side-ledge 502 of FIG. 5A) by passing fasteners (not shown) through the plurality of mounting holes 556 to mount the carriage 504 to interior structure of a side-ledge. In addition, or alternatively, other fastening mechanisms not shown may be employed to fasten the holding apparatus 500 to a side-ledge. For example, snap-clips (not shown) may be integrated about one or more of the outwardly-facing perimeters 508, 512 of the carriage 504. The snap-clips could then be used to snap-fit the carriage 504 to a side-ledge.

Referring now to the rotatable insert 506, the rotatable insert 506 includes a first insert panel 558, a second insert panel 560 opposite the first insert panel 558, and a compartment 562 between the first and second insert panels 558, 560. The rotatable insert 506 also includes a rear insert panel 564 and a front insert panel 566 opposite the rear insert panel 564. A curved transition 565 may be included along the rear insert panel 564. As will be discussed below with respect to FIGS. 5C-5E, the compartment 562 is hidden when the rotatable insert 506 is in a stowed position and is configured to carry at least one item (e.g., a drinking vessel) when the rotatable insert 506 is in an open position.

With continued reference to FIG. 5B, the first insert panel 558 includes a first protrusion 568 and a second protrusion 570 extending outwardly therefrom. The first protrusion 568 is configured to engage with the first slot 526 and the second protrusion 570 is configured to engage with the second slot 528.

The second insert panel 560 may also include one or more protrusions (see, e.g., the third protrusion 572 and the fourth protrusion 574 of FIG. 5B). If employed, the third protrusion 572 is configured to engage with the third slot 548 and the fourth protrusion 574 is configured to engage with the fourth slot 550.

Figure 5C:
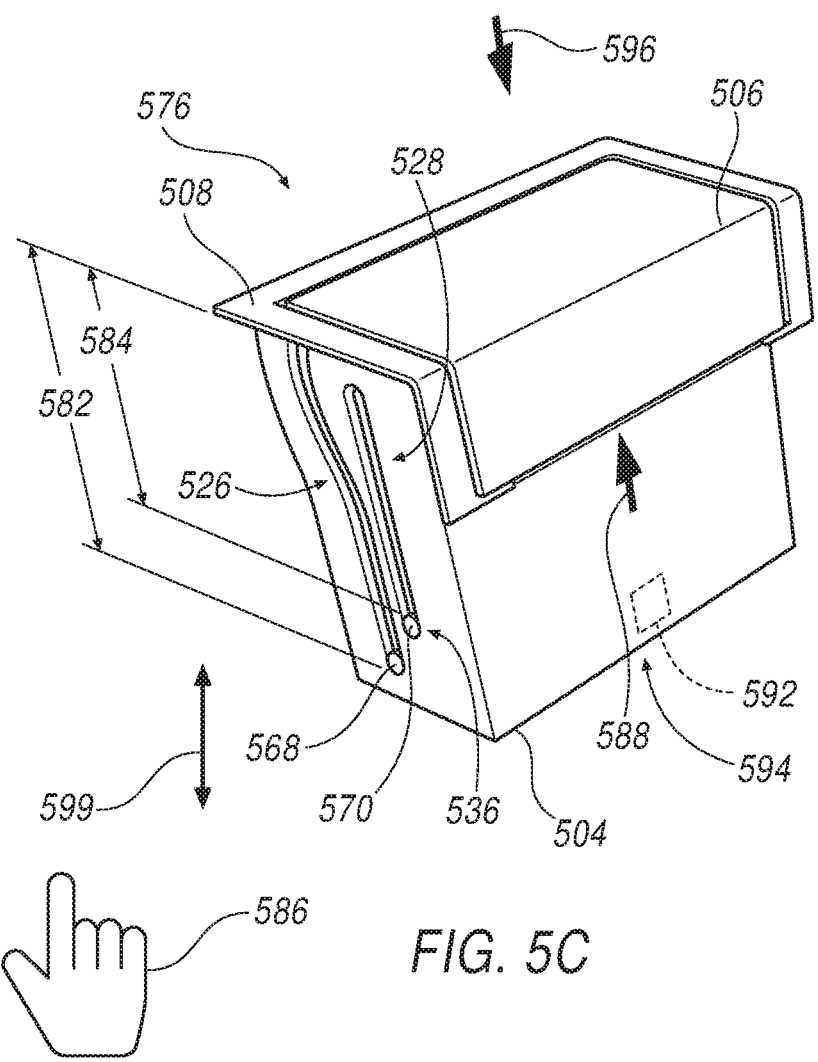
FIG. 5C is a perspective view the exemplary holding apparatus of FIG. 5A in a stowed position.
Figure 5D:
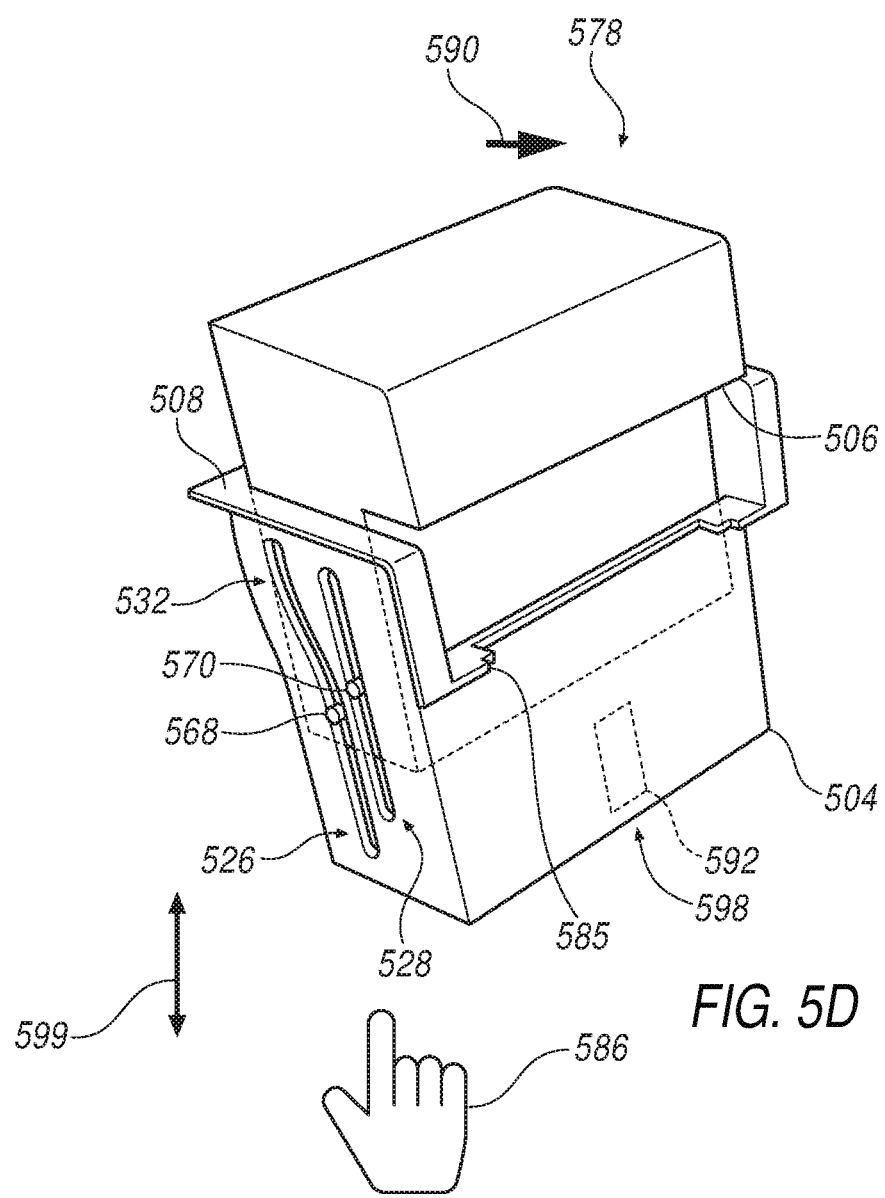
FIG. 5D is a perspective view the exemplary holding apparatus of FIG. 5A in an intermediate position.
Figure 5E:
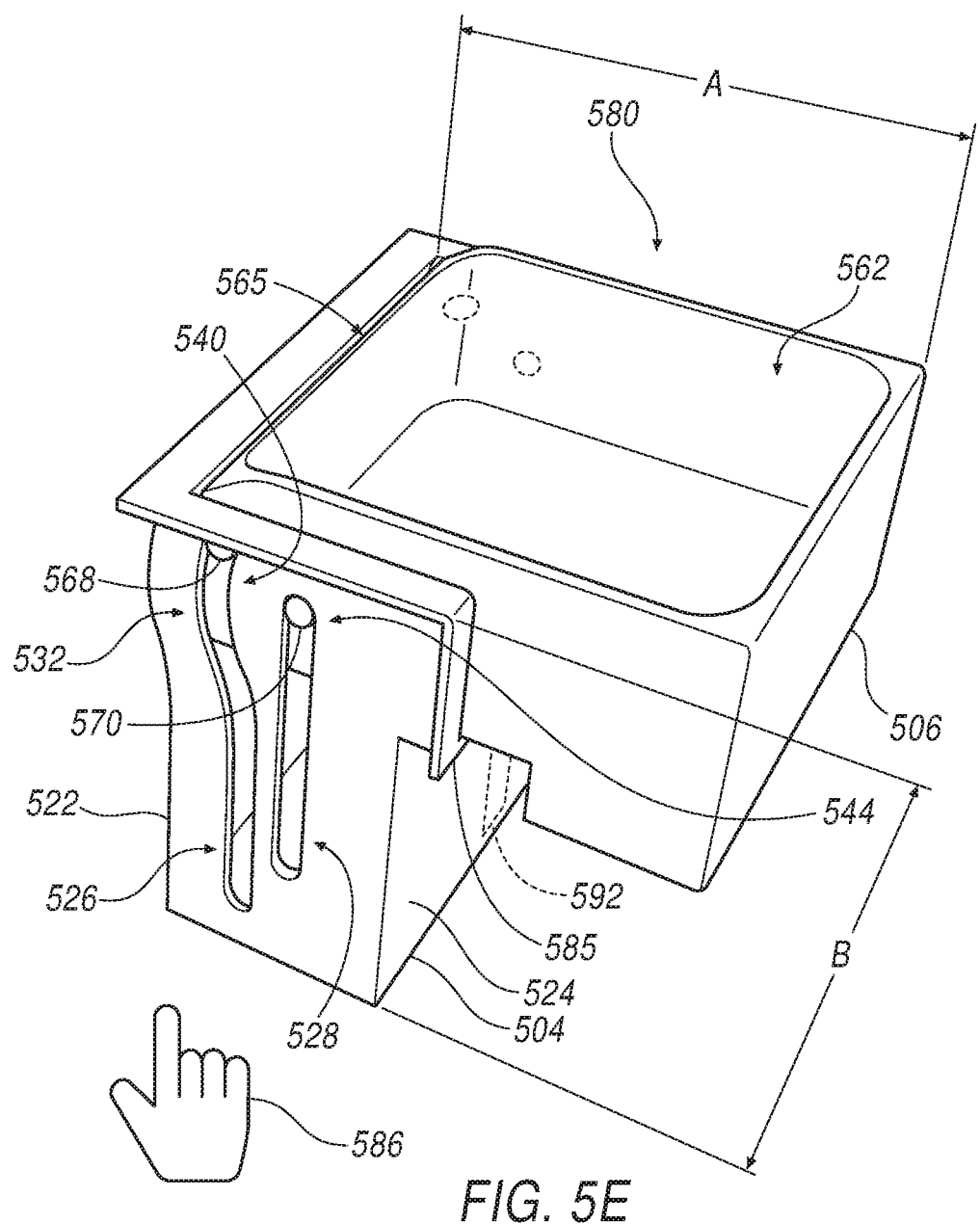
FIG. 5E is a perspective view the exemplary holding apparatus of FIG. 5A in an open position.

With reference now to FIGS. 5C-5E, the holding apparatus 500 of FIG. 5B is shown in operation. FIG. 5C illustrates the holding apparatus 500 in a first or stowed position 576. FIG. 5D illustrates the holding apparatus 500 in an intermediate position 578 (i.e., a partially open/closed position), while FIG. 5E illustrates the holding apparatus 500 in a third or open position 580. As shown, the first and second protrusions 568, 570 respectively engage with the first and second slots 526, 528 during operation. If employed, the remaining protrusions 572, 574 and slots 548, 550 are engaged in a similar manner (see FIG. 5B).

When the rotatable insert 506 is in the stowed position 576 as shown in FIG. 5C, the first and second protrusions 568, 570 are in the bottom portions 534, 536 of the respective slots 526, 528. Further, the first protrusion 568 is a first distance 582 from the outwardly facing top-perimeter 508 of the carriage 504 and the second protrusion 570 is a second distance 584 from the outwardly facing top-perimeter 508 of the carriage 504. Since the second distance 584 is less than the first distance 558, the second protrusion 570 is closer to the outwardly facing top-perimeter 508 of the carriage 504 than the first protrusion 568.

By comparing FIGS. 5C and 5D, it is shown that the rotatable insert 506 does not substantially rotate as it travels from the stowed position 576 to the intermediate position 578. Rather, the rotatable insert 506 moves in a substantially vertical direction without rotating. As such, the first and second protrusions 568, 570 travel vertically (without rotation) towards the outwardly facing top-perimeter 508 of the carriage 504 as the rotatable insert 506 moves from the stowed position 576 to the intermediate position 578.

Further, since the bottom portion 534 of the first slot 526 is substantially parallel to at least a bottom portion 536 of the second slot 528, the rotatable insert 506 does not bind in the carriage 504 as it is raised from the stowed position 576 to the intermediate position 575.

The rotatable insert 506 does not begin to substantially rotate until the rotatable insert 506 moves from the intermediate position 578 of FIG. 5C to the open position 580 of FIG. 5D. During this transition, the first protrusion 568 travels along the arcuate curve 532 of the first slot 526 as the second protrusion 570 continues its linear motion in the second slot 528. As such, due to the arcuate curve 532 of the first slot 526 and the positioning of the first and second protrusions 568, 570, the rotatable insert 506 and its first and second protrusions 568, 570 rotate during the transition from the intermediate position 578 to the open position 580. Further, the slots 526, 528 are spaced from the rear carriage panel 522 such that the rotatable insert 506 does not bind with the carriage 504 during rotation from the intermediate position 576 to the open position 580. As illustrated, the contour of the rear carriage panel 522 at least partially mimics the shape or contour of the first slot 526. As such, space between the rear carriage panel 522 and the first slot 526 can be minimized while still allowing uninhibited movement between the stowed and open positions 576, 580. Other examples not shown, however, need not include a rear panel having the same contour as the first slot.

Referring back to FIG. 5D, the curved transition 565 (if included) of the rear insert panel 564 can also be employed to ensure binding does not occur as the rotatable insert 506 moves from the intermediate position 578 to the open position 580. The curved transition 565 also allows space to be conserved and provides a comfortable aesthetic.

Once in the open position 580, as shown in FIG. 5E, the first protrusion 568 is closer to the outwardly facing top-perimeter 508 of holding apparatus 500 than the second protrusion 570. This orientation of the first and second protrusions 568, 570 while in the open position 580 is in contrast to their orientation when in the stowed position 576, where the second protrusion 570 is instead closer to the outwardly facing top-perimeter 508 than the first protrusion 568.

Also while in the open position 580, the rotatable insert 506 is supported by a support ledge 585 of the front carriage panel 524 while at least one the first and second protrusions 568, 570 are restrained by the respective top end 540, 544 of the first and second slot 526, 528. As such, the rotatable insert 506 can now support an item such as a drinking vessel (not shown) in its now revealed compartment 562 without tipping forward. For example, when the rotatable insert 506 is in the open position 580, the force of a drinking vessel (or other item) will not cause the rotatable insert to tip forward since at least one of the protrusions 568, 570 is restrained by the respective top end 540, 544 of its respective slot 526, 528 and the rotatable insert 506 bears down on the support ledge 585. The support ledge also prevents the rotatable insert from sliding back down the slots 526, 526. If the third and fourth protrusions 572, 574 and the respective third and fourth slots 548, 550 (see FIG. 5B) are also employed, further stability may be provided to the rotatable insert 506.

The rotatable insert 506 has a linear dimension A that is less than a linear dimension B of the carriage 504. As such, when the rotatable insert is in the stowed position 576 (FIG. 5C), the rotatable insert 506 does not protrude (or at least appreciably protrude) above the visible perimeters 508, 512 of the carriage 504.

Referring now to FIGS. 5C-5E, operation of the holding apparatus 500 by a user or passenger 586 will be discussed. The user 586 may operate the holding apparatus 500 by simply applying an upward force 588 (FIG. 5C) to the rotatable insert 506, thus lifting the rotatable insert 506 to the intermediate position 578 (FIG. 5D). The user 586 may then apply a horizontal force 590 to the rotatable insert 506, thus causing the rotatable insert 506 to rotate from the intermediate position 578 of FIG. 5D to the open position 580 of FIG. 5E. While the description of the motion of the rotatable insert 506 has been described in terms of the application of discrete forces 588, 590, the rotatable insert 506 may of course be moved from the stowed position 576 to the open position 580 in one simple motion.

Referring to FIG. 5C, while the holding apparatus 500 may be operated as described above, the holding apparatus 500 may include a lifting mechanism 592 to aid in its operation. The lifting mechanism 592 may, for example, be an actuator, a spring, or spring-like device. To operate, when the lifting mechanism 592 is in a closed state 594 (e.g., a latched state), the user 586 may apply a downward force 596 to the rotatable insert 506. The downward force 596 causes the lifting mechanism 592 to unlatch and move from the closed state 594 to an open state 598 as shown in FIG. 5D. As such, the lifting mechanism 592 moves the rotatable insert 506 in a vertical direction 599 to the intermediate position 578. The user may then simply apply a horizontal force (e.g., the horizontal force 590 of FIG. 5C) to cause the rotatable insert 506 to rotate from the intermediate position 578 to the open position 580. To close the rotatable insert 506, the user may rotate the rotatable insert 506 back to the intermediate position 578 and then apply a downward force (e.g., the downward force 596 of FIG. 5C) to place the lifting mechanism 592 back in the closed or latched state 594, thus placing the rotatable insert 506 in the stowed position 576.

The relationship between the linear dimension A of the rotatable insert 506 and the linear dimension B of the carriage 504 may be selected such that there is adequate space for the lifting mechanism 592 between rear panel 564 of the rotatable insert and the rear carriage panel 522.

Though not shown, alternatives to the lifting mechanism 592 may also be employed.

Regarding the holding apparatuses discussed herein, a variety of materials may be used to manufacture components or elements thereof. For example, polymers and/or metals such aluminum may be used to manufacture components or elements of the holding apparatuses. Exemplary manufacturing techniques may include injection molding using a polymer(s), machining from metal, or casting from metal. In addition or alternatively, 3-D printing techniques may be employed during the manufacture of the holding apparatuses discussed above.

Figure 6:
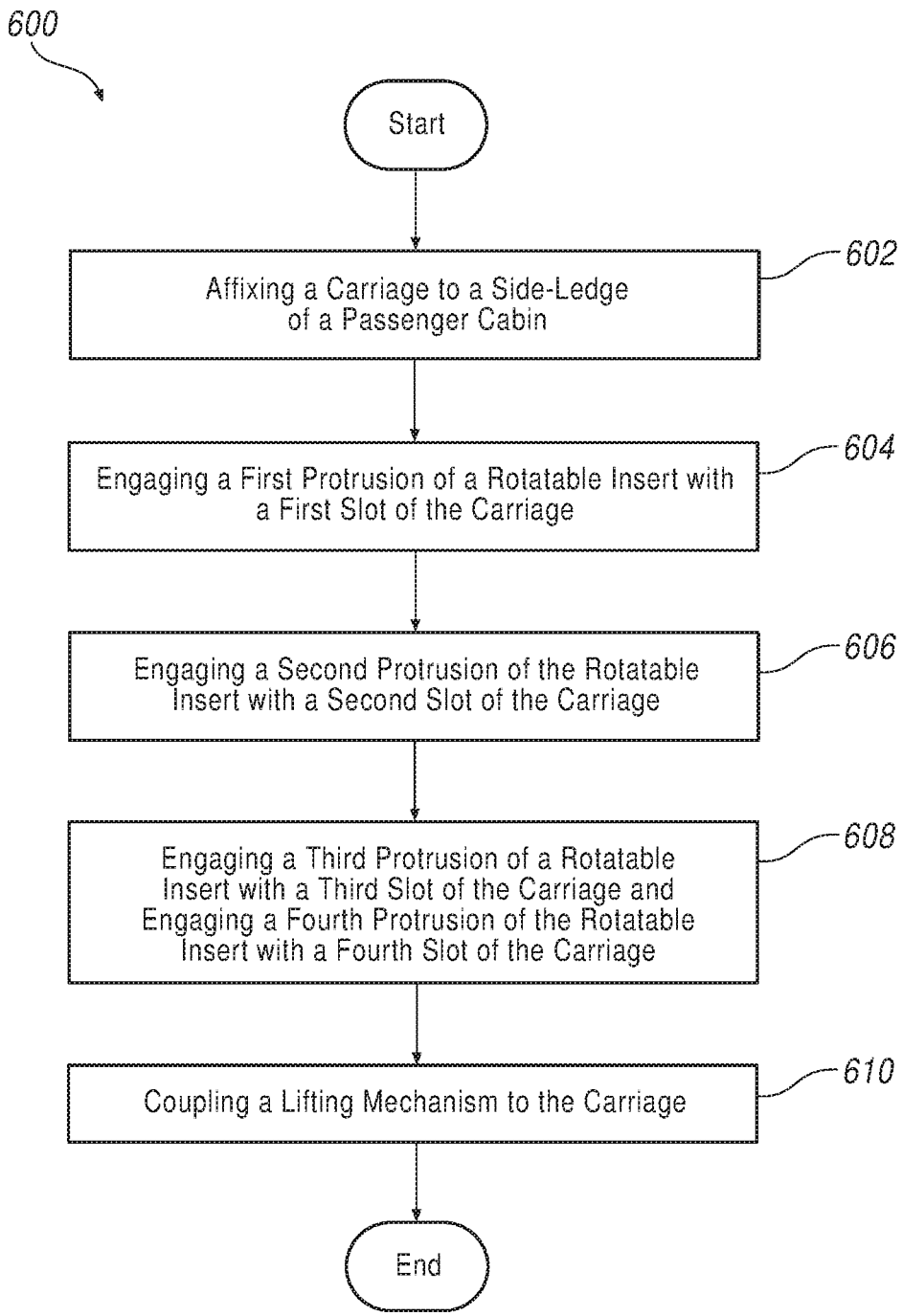
FIG. 6 is a flowchart setting forth another exemplary technique for installing a holding apparatus.

Referring now to FIG. 6, an exemplary technique 600 for installing a holding apparatus in a side-ledge of a passenger cabin is set forth in a flowchart.

An exemplary process control may begin at BLOCK 602, where affixing a carriage to the side-ledge of the passenger cabin is carried out. When carried out, an outwardly facing top-perimeter of the carriage is substantially parallel with a horizontal surface of the side-ledge and an outwardly facing side-perimeter of the carriage is substantially parallel with a vertical surface of the side-ledge. In addition to these perimeters being parallel with the respective surfaces, they may also be flush with the respective surfaces.

Upon affixing the carriage to the side-ledge, process control moves to engaging a first protrusion of a rotatable insert with a first slot of the carriage at BLOCK 604 and engaging a second protrusion of the rotatable insert with a second slot of the carriage at BLOCK 606. The rotatable insert is configured to move from a stowed position in the carriage to an open position in the carriage to reveal a holding compartment. Further, the first slot of the carriage has a concave portion thereto and the second slot is linear.

While the exemplary technique 600 of FIG. 6 sets forth an order to BLOCKS 602-606, other exemplary techniques need not follow such an order. For example, other exemplary techniques not shown may carry out engaging the second protrusion with the carriage (BLOCK 606) prior to engaging the first protrusion with the carriage (BLOCK 604). Further, other exemplary techniques may also carry out engaging the first and/or second protrusion with the carriage (BLOCK 604 and/or BLOCK 606) prior to affixing the carriage to the side-ledge of the passenger cabin at BLOCK 602.

Referring back to the technique 600 of FIG. 6, there may be several relationships between the first and second slots. For example, the second slot may have a bottom portion that is substantially linear and substantially parallel to the second slot and the concave portion of the first slot may face the second slot. Further, the first slot may extend closer to the outwardly facing top-perimeter of the carriage than the second slot.

Process control of the exemplary technique 600 may also proceed to BLOCK 608, where engaging a third protrusion of a rotatable insert with a third slot of the carriage and engaging a fourth protrusion of the rotatable insert with a fourth slot of the carriage may be carried out. If such an engagement is carried out, the third slot is congruent in shape to the first slot and the fourth slot is congruent in shape with the second slot. Further, the first and second slots are on a first carriage panel of the carriage and the third and fourth slots are on a second carriage panel of the carriage. The second carriage panel is opposite the first carriage panel.

Proceeding to BLOCK 610, process control may carry out coupling a lifting mechanism to the carriage. The lifting mechanism is configured to move the rotatable insert vertically to an intermediate position between the stowed and open positions. This movement causes the first, second, third, and fourth protrusions to travel vertically in the respective first, second, third, and fourth slots.

It is noted that the rotatable insert is configured such that, (i) when the rotatable insert is in the stowed position, the second protrusion is closer to the outwardly facing top-perimeter of the carriage than the first protrusion and (ii) when the rotatable insert is in the open position, the first protrusion is closer to the outwardly facing top-perimeter of the carriage than the second protrusion. The rotatable insert may also be configured to include a curved transition along its rear panel to inhibit binding as the rotatable insert is moved from the stowed to the open position, and vice versa. The curved transition also allows spaced to be minimized by allowing the space between the rear carriage panel and closest slot to be minimized.

Upon coupling the lifting mechanism to the carriage, process control may proceed to an END.

Similar to the order set forth above with respect to BLOCKS 602-606, the order of BLOCKS 608-610 need not be carried out as set forth in the flowchart. That is, the engaging of the third and fourth protrusions with the carriage (BLOCK 608) and the coupling of the lifting mechanism to the carriage (BLOCK 610) may occur anytime during installation of a holding tray apparatus in a side-ledge of a passenger cabin.

With regard to FIGS. 1-6 and the processes, systems, methods, techniques, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of terms such as "first," "second," "third," and the like that immediately precede an element(s) do not necessarily indicate sequence unless set forth otherwise, either explicitly or inferred through context.

The invention claimed is:

1. An apparatus for a vehicle comprising:
   a carriage and a rotatable insert configured to be moved between a stowed position and an open position in the carriage, the carriage is configured to be mounted within a side-ledge of the vehicle, the carriage comprises:
   a first carriage panel having a first slot and a second slot therein, wherein the first slot has an arcuate curve thereto and the second slot is linear;
   and wherein the rotatable insert comprises:
   a first insert panel having a first and second protrusion extending therefrom, the first protrusion is configured to engage with the first slot and the second protrusion is configured to engage with the second slot such that, as the rotatable insert is moved to the open position, the first and second protrusions travel respectively up the first and second slots, wherein, when the carriage is mounted within the side-ledge, an outwardly facing top-perimeter of the carriage is substantially parallel with a horizontal surface of the side-ledge and an outwardly facing side-perimeter of the carriage is substantially parallel with a vertical surface of the side-ledge, and wherein the first slot extends closer to the outwardly facing top-perimeter of the carriage than the second slot; and
   a compartment that is hidden when the rotatable insert is in the stowed position and is configured to carry at least one item when the rotatable insert is moved to the open position.

2. The apparatus of claim 1, the first slot having a bottom portion that is parallel to the second slot.

3. The apparatus of claim 1, the carriage further comprising a second carriage panel having a third slot and a fourth slot therein, the third slot is congruent in shape to the first slot and the fourth slot is congruent in shape to the second slot, wherein the second carriage panel is opposite the first carriage panel.

4. The apparatus of claim 3, the rotatable insert further comprising:
   a second insert panel having a third and fourth protrusion extending therefrom, the third protrusion is configured to engage with the third slot and the fourth protrusion is configured to engage with the fourth slot such that, as the rotatable insert is moved to the open position, the third and fourth protrusions travel respectively up the third and fourth slots; and
   a rear insert panel having a curved transition extending between the first insert panel and the second insert panel, the curved transition prevents binding between the carriage and the rotatable insert as the rotatable insert is placed in the open position.

5. The apparatus of claim 4 further comprising a lifting mechanism coupled to the carriage, the lifting mechanism is configured to vertically lift the rotatable insert from the stowed position to an intermediate position between the open position and the stowed portion.

6. The apparatus of claim 2, the rotatable insert is configured such that, (i) when the rotatable insert is in the stowed position, the second protrusion is closer to the outwardly facing top-perimeter of the carriage than the first protrusion and (ii) when the rotatable insert is in the open position, the first protrusion is closer to the outwardly facing top-perimeter of the carriage than the second protrusion.

7. The apparatus of claim 2 wherein the first and second slots are configured such that, as the rotatable insert travels from the stowed position to the open position, the first and second protrusions first travel towards the outwardly facing top-perimeter of the carriage before rotating.

8. An apparatus for a vehicle comprising:
   a carriage configured to be mounted to a side-ledge of a vehicle, the carriage comprises:
   a first carriage panel having a having a first slot and a second slot therein, the first slot is vertically longer than the second slot, wherein the second slot is substantially linear and the first slot has a concave portion facing the second slot; and
   a rotatable insert configured to be rotatable from a stowed position to an open position in the carriage, the rotatable insert comprises:
   a first inert panel having a first protrusion configured to enter the first slot and a second protrusion configured to enter the second slot such that the first and second protrusions travel up the respective first and second slots as the rotatable insert moves from the stowed position to the open position; and
   a compartment that is hidden from view when the rotatable insert is in the stowed position and is configured to carry at least one item when the rotatable insert is rotated to the open position.

9. The apparatus of claim 8 wherein, when the carriage is mounted to the side-ledge, an outwardly facing top-perimeter of the carriage is substantially parallel with a horizontal surface of the side-ledge and an outwardly facing side-perimeter of the carriage is substantially parallel with a vertical surface of the side-ledge.

10. The apparatus of claim 9, the first slot having a bottom portion that is substantially linear and substantially parallel to the second slot, and wherein the first slot extends closer to the outwardly facing top-perimeter of the carriage than the second slot.

11. The apparatus of claim 10 wherein the carriage further comprising a second carriage panel opposite the first carriage panel, the second carriage panel having a third slot and a fourth slot therein, the third slot is congruent in shape to the first slot and the fourth slot is congruent in shape to the second slot; and
   wherein the rotatable insert further comprises:
   a second insert panel having a third protrusion and a fourth protrusion, the third protrusion configured to enter the third slot and the fourth protrusion configured to enter the fourth slot such that the third and fourth protrusions travel up the respective third and fourth slots as the rotatable insert moves from the stowed position to the open position; and
   a rear insert panel having a curved transition extending between the first insert panel and the second insert panel, the curved transition prevents binding between the carriage and the rotatable insert as the rotatable insert is placed in the open position.

12. The apparatus of claim 10, the rotatable insert is configured such that, (i) when the rotatable insert is in the stowed position, the second protrusion is closer to the outwardly facing top-perimeter of the carriage than the first protrusion and (ii) when the rotatable insert is in the open position, the first protrusion is closer to the outwardly facing top-perimeter of the carriage than the second protrusion.

13. The apparatus of claim 10 wherein the first and second slots are configured such that, as the rotatable insert travels from the stowed position to the open position, the rotatable insert first travels vertically before rotating.

14. The apparatus of claim 13 further comprising a lifting mechanism coupled to the carriage, the lifting mechanism configured to vertically lift the rotatable insert to an intermediate position between the stowed position and the open position.

15. A method of manufacturing a holding apparatus for a side-ledge of a vehicle comprising:
creating a carriage affixable to the side-ledge of the vehicle such that an outwardly facing top-perimeter of the carriage is substantially parallel with a horizontal surface of the side-ledge and an outwardly facing side-perimeter of the carriage is substantially parallel with a vertical surface of the side-ledge;
forming a first protrusion on a first insert panel of a rotatable insert, the first protrusion is engageable with a first slot of a first carriage panel of the carriage such that the first protrusion travels up the first slot as the rotatable insert moves from a stowed position to an open position, wherein the rotatable insert is configured to move from the stowed position in the carriage to the open position in the carriage to reveal a holding compartment such that the holding compartment is hidden from view when the rotatable insert is in the stowed position and revealed when the rotatable insert is in the open position, and wherein the holding compartment is configured to hold at least one item when the rotatable insert is in the open position; and
forming a second protrusion on the first insert panel of the rotatable insert, the second protrusion is engageable with a second slot of the first carriage panel of the carriage such that the second protrusion travels up the second slot as the rotatable insert moves from the stowed position to the open position, wherein the first slot has a concave portion thereto and the second slot is linear.

16. The method of claim 15, the first slot having a bottom portion that is substantially linear, the bottom portion of the first slot is substantially parallel to the second slot while the concave portion of the first slot faces the second slot, and wherein the first slot extends closer to the outwardly facing top-perimeter of the carriage than the second slot.

17. The method of claim 16 further comprising:
forming a third protrusion of a rotatable insert that is engageable with a third slot of the carriage, the third slot is congruent in shape to the first slot; and
forming a fourth protrusion of the rotatable insert that is engageable with a fourth slot of the carriage, the fourth slot is congruent in shape with the second slot, wherein the third and fourth slots are on a second carriage panel that is opposite the first carriage panel.

18. The method of claim 17 further comprising creating a lifting mechanism that is couplable to the carriage, wherein the lifting mechanism is configured to move the rotatable insert vertically to an intermediate position causing the first, second, third, and fourth protrusions to travel vertically in the respective first, second, third, and fourth slots.

19. The method of claim 16 wherein the rotatable insert is configured such that, (i) when the rotatable insert is in the stowed position, the second protrusion is closer to the outwardly facing top-perimeter of the carriage than the first protrusion and (ii) when the rotatable insert is in the open position, the first protrusion is closer to the outwardly facing top-perimeter of the carriage than the second protrusion.

* * * * *